US010222765B2

(12) United States Patent
Ueda et al.

(10) Patent No.: US 10,222,765 B2
(45) Date of Patent: Mar. 5, 2019

(54) INDUSTRIAL MACHINE SYSTEM, INDUSTRIAL MACHINE, TERMINAL DEVICE, SERVER AND PARAMETER EDITING METHOD OF INDUSTRIAL MACHINE

(71) Applicant: Kabushiki Kaisha Yaskawa Denki, Kitakyushu-shi (JP)

(72) Inventors: Takeshi Ueda, Kitakyushu (JP); Daisuke Tokitou, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 116 days.

(21) Appl. No.: 15/361,559

(22) Filed: Nov. 28, 2016

(65) Prior Publication Data
US 2017/0153608 A1    Jun. 1, 2017

(30) Foreign Application Priority Data

Dec. 1, 2015 (JP) ................................ 2015-234754

(51) Int. Cl.
G05B 13/02 (2006.01)
G05B 19/409 (2006.01)

(52) U.S. Cl.
CPC ......... G05B 13/024 (2013.01); G05B 19/409 (2013.01); G05B 2219/2202 (2013.01)

(58) Field of Classification Search
CPC .............................................. B01D 2257/302
USPC ......................................................... 700/52
See application file for complete search history.

(56) References Cited

U.S. PATENT DOCUMENTS

| 6,587,812 B1 * | 7/2003 | Takayama ............... B30B 15/14 |
| | | 702/182 |
| 9,678,492 B2 * | 6/2017 | Obermeier ......... G05B 19/0428 |
| 2003/0177440 A1 | 8/2003 | Kegoya et al. |
| 2006/0179120 A1 | 8/2006 | Kegoya et al. |
| 2006/0179121 A1 | 8/2006 | Kegoya et al. |

(Continued)

FOREIGN PATENT DOCUMENTS

| JP | 2001-282323 | 10/2001 |
| JP | 2003-77785 | 3/2003 |

(Continued)

OTHER PUBLICATIONS

Office Action dated Mar. 21, 2017 in Japanese Patent Application No. 2015-234754 (with English translation).

(Continued)

*Primary Examiner* — Suresh Suryawanshi
(74) *Attorney, Agent, or Firm* — Oblon, McClelland, Maier & Neustadt, L.L.P.

(57) ABSTRACT

An industrial machine system includes an industrial machine including circuitry which controls operation of a control target machine based on multiple parameters and a set control mode among multiple control modes, and a terminal device including circuitry which changes at least part of the parameters in the industrial machine through wireless communication. The circuitry of the industrial machine sorts out, based on the set control mode, changeable parameters changeable by the terminal device among the parameters, and the circuitry of the terminal device controls display of the changeable parameter sorted by the circuitry of the industrial machine on a display.

20 Claims, 10 Drawing Sheets

(56) References Cited

U.S. PATENT DOCUMENTS

| | | | |
|---|---|---|---|
| 2006/0190624 A1 | 8/2006 | Kegoya et al. | |
| 2011/0096230 A1* | 4/2011 | Komiya | G06F 3/1454 348/441 |
| 2011/0241447 A1 | 10/2011 | Ando et al. | |
| 2012/0083220 A1* | 4/2012 | Rodermund | H04W 24/00 455/67.11 |
| 2015/0330652 A1* | 11/2015 | Kim | F24F 11/006 700/276 |
| 2017/0176041 A1* | 6/2017 | Osaki | F24F 11/0086 |

FOREIGN PATENT DOCUMENTS

| | | |
|---|---|---|
| JP | 2003-167606 A | 6/2003 |
| JP | 2007-263406 | 10/2007 |
| JP | 2009-282613 A | 12/2009 |
| JP | 2011-229359 A | 11/2011 |
| JP | 2012-14368 A | 1/2012 |
| JP | 2014-11659 A | 1/2014 |
| JP | 2014-174616 | 9/2014 |
| JP | 2015-1848 | 1/2015 |

OTHER PUBLICATIONS

Office Action dated Aug. 22, 2017 in Japanese Patent Application No. 2015-234754 (with unedited computer generated English translation).

* cited by examiner

| Control Mode | Parameter |
|---|---|
| Control Mode 1 | Parameter A, Parameter C, Parameter D, Parameter H,... |
| Control Mode 2 | Parameter A, Parameter C, Parameter F, Parameter G,... |
| ... | ... |

| Acess Level | Parameter |
|---|---|
| Access Level 1 | Parameter A, Parameter H,... |
| Access Level 2 | Parameter A, Parameter B, Parameter D, Parameter H,... |
| ... | ... |

| Terminal ID | User ID | Acess Level |
|---|---|---|
| 001 | xx1 | Access Level 1 |
| | ... | ... |
| 002 | xx1 | Access Level 2 |
| | ... | ... |
| ... | ... | ... |

FIG. 10

| Date and Time | Industrial Machine ID | Type | Application Information | Terminal ID | User ID | Parameter No. | Before Change | After Change | Abnormality Information |
|---|---|---|---|---|---|---|---|---|---|
| 2015/11/04 14:16 | zzz1 | C0001 | A1 | 002 | xx2 | a1-01 | 10 | 50 | E1 |
| ... | ... | ... | ... | ... | ... | ... | ... | ... | ... |

| Date and Time | Industrial Machine ID | ... | Application Information | Terminal ID | ... | Parameter No. | ... | |
|---|---|---|---|---|---|---|---|---|
| | | | | | | | | |
| 2015/11/01 10:01 | zzz3 | ... | A1 | 003 | ... | a1-01 | ... | ~333a |
| 2015/11/01 10:02 | zzz3 | ... | A1 | 003 | ... | b1-01 | ... | ~333b |
| | | | | | | | | |
| 2015/11/03 17:10 | zzz6 | ... | A2 | 006 | ... | c1-01 | ... | ~333c |
| 2015/11/03 17:11 | zzz6 | ... | A2 | 006 | ... | a1-01 | ... | ~333d |
| | | | | | | | | |

| Date and Time | Industrial Machine ID | ... | Parameter No. | ... | After Change | Abnormality ID | |
|---|---|---|---|---|---|---|---|
|  |  |  |  |  |  |  |  |
| 2015/11/02 11:01 | zzz4 | ... | d1-01 | ... | 50 | E1 | ⌐333e |
| 2015/11/02 11:02 | zzz4 | ... | d1-01 | ... | 55 | E1 | ⌐333f |
| 2015/11/02 11:03 | zzz4 | ... | d1-01 | ... | 60 | - | ⌐333g |
|  |  |  |  |  |  |  |  |

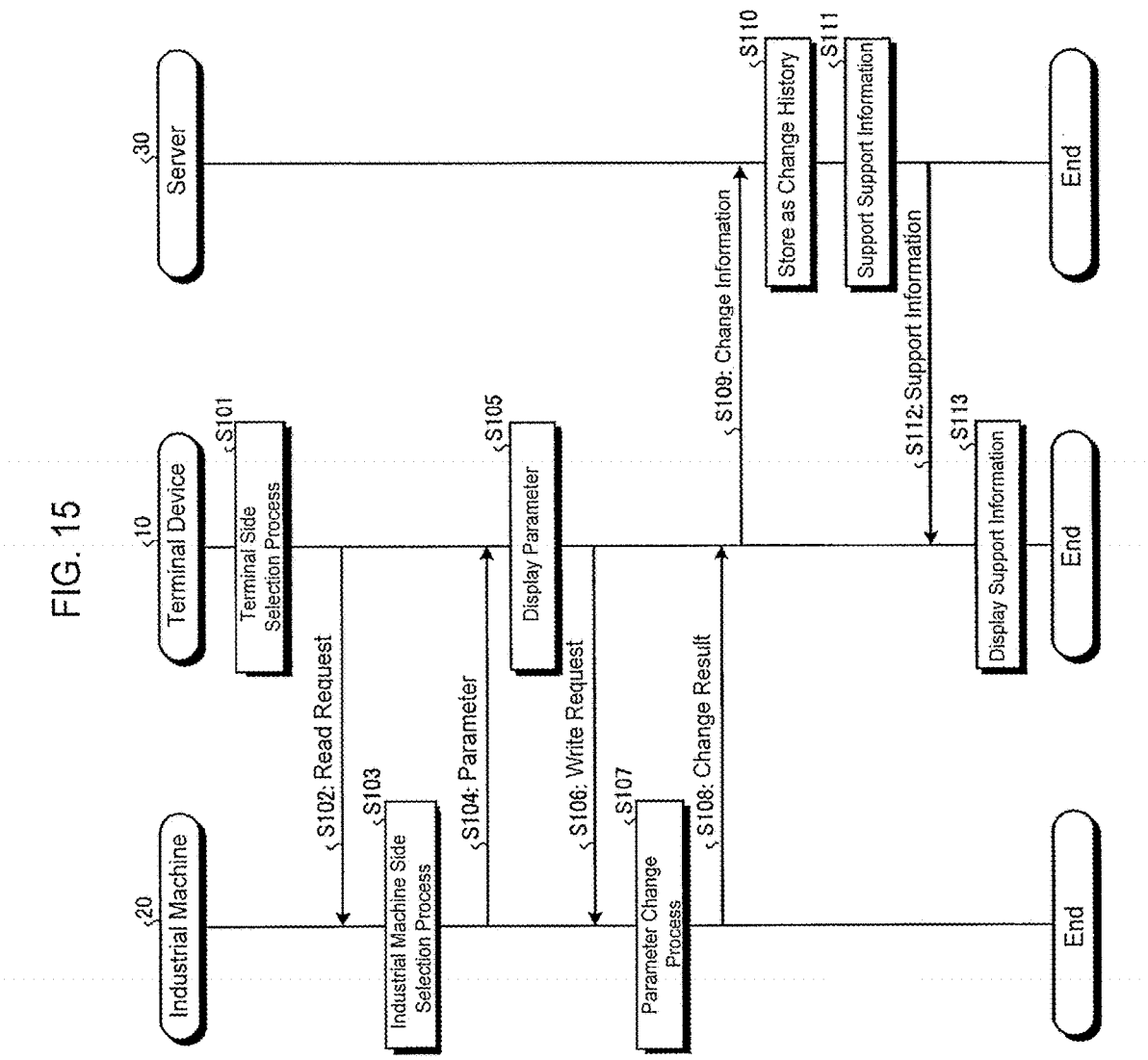

INDUSTRIAL MACHINE SYSTEM, INDUSTRIAL MACHINE, TERMINAL DEVICE, SERVER AND PARAMETER EDITING METHOD OF INDUSTRIAL MACHINE

CROSS-REFERENCE TO RELATED APPLICATIONS

The present application is based upon and claims the benefit of priority to Japanese Patent Application No. 2015-234754, filed Dec. 1, 2015, the entire contents of which are incorporated herein by reference.

BACKGROUND OF THE INVENTION

Field of the Invention

An embodiment of the disclosure relates to an industrial machine system, an industrial machine, a terminal device, a server and a parameter editing method of the industrial machine.

Description of Background Art

Japanese Patent Laid-Open Publication No. 2011-229359 describes a system in which an engineering tool connected to an industrial machine is used to perform an editing operation of a parameter that is set in the industrial machine. The entire contents of this publication are incorporated herein by reference.

SUMMARY OF THE INVENTION

According to one aspect of the present invention, an industrial machine system includes an industrial machine including circuitry which controls operation of a control target machine based on multiple parameters and a set control mode among multiple control modes, and a terminal device including circuitry which changes at least part of the parameters in the industrial machine through wireless communication. The circuitry of the industrial machine sorts out, based on the set control mode, changeable parameters changeable by the terminal device among the parameters, and the circuitry of the terminal device controls display of the changeable parameter sorted by the circuitry of the industrial machine on a display.

According to another aspect of the present invention, an industrial machine includes circuitry which controls operation of a control target machine based on multiple parameters and a set control mode among multiple control modes. The circuitry of the industrial machine communicates, through wireless communication, with a terminal device including circuitry which changes at least part of the parameters in the industrial machine, and sort outs, based on the set control mode, changeable parameters changeable by the terminal device among the parameters, and the circuitry of the terminal device controls display of the changeable parameter sorted by the circuitry of the industrial machine on a display.

According to yet another aspect of the present invention, a method for editing a parameter of an industrial machine includes sorting out, based on a set control mode, changeable parameters changeable by a terminal device among multiple parameters by circuitry of an industrial machine, and controlling display of the changeable parameter sorted by the circuitry of the industrial machine on a display by circuitry of the terminal device. The industrial machine includes the circuitry which controls operation of a control target machine based on the parameters and the set control mode among multiple control modes, and the terminal device includes the circuitry which changes at least part of the parameters in the industrial machine through wireless communication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates an example of first filtering information;

FIG. 7 illustrates an example of second filtering information;

FIG. 8 illustrates an example of level change information;

FIG. 10 illustrates an example of a change history of a parameter;

FIG. 15 illustrates an example of a processing flow of devices in the industrial machine system.

DETAILED DESCRIPTION OF THE EMBODIMENTS

Figure 1:
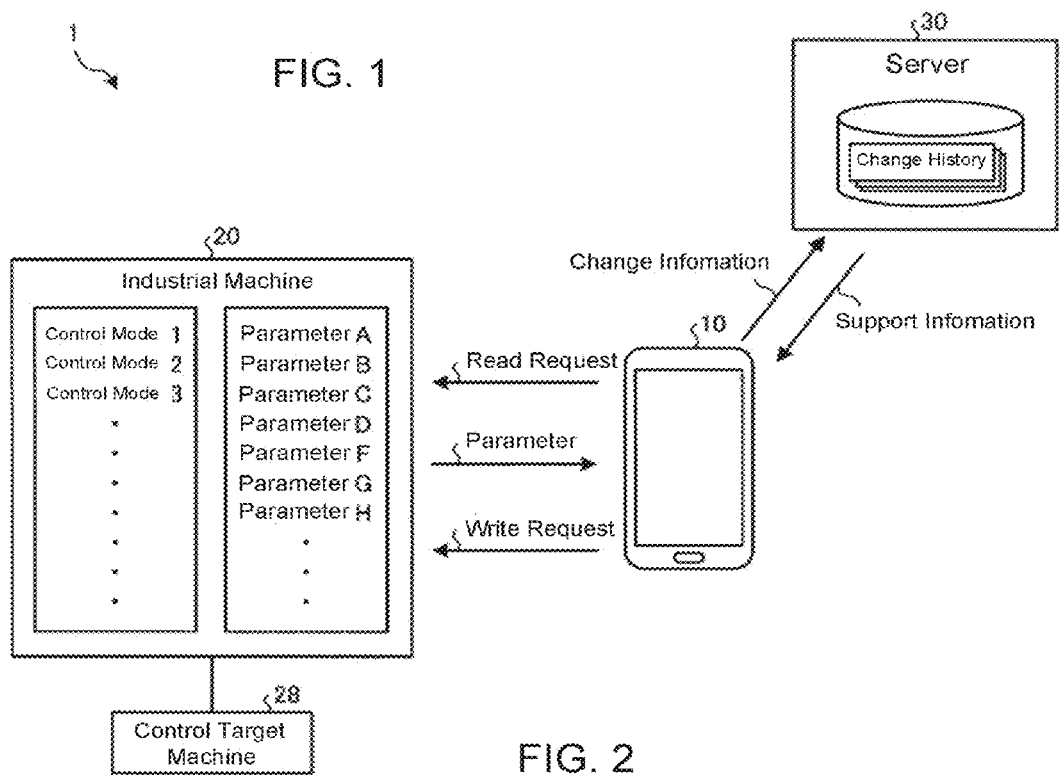
FIG. 1 illustrates a processing example of an industrial machine system.

The embodiments will now be described with reference to the accompanying drawings, wherein like reference numerals designate corresponding or identical elements throughout the various drawings.

Industrial Machine System

Figure 2:
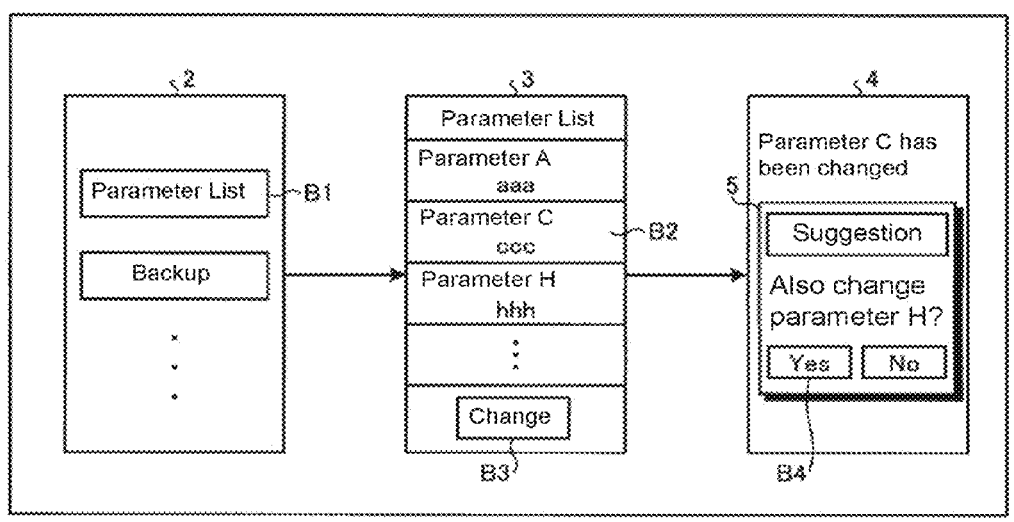
FIG. 2 illustrates an example of a screen displayed in a display of a terminal device.

FIG. 1 illustrates a processing example of an industrial machine system. Further, FIG. 2 illustrates an example of a screen displayed in a display of a terminal device.

As illustrated in FIG. 1, an industrial machine system 1 includes a terminal device 10, an industrial machine 20, a control target machine 28, and a server 30.

The terminal device 10 is connected to the industrial machine 20 and the server 30 by wireless communication. The industrial machine 20 controls an operation of the control target machine 28 based on a set control mode among multiple control modes and multiple parameters. The server 30 manages backup data, change history and the like of the parameters of the industrial machine 20.

In such an industrial machine system 1, a series of parameter editing operations such as reading a parameter from the industrial machine 20, changing the read parameter and writing the parameter after the change to the industrial machine 20 are performed by the terminal device 10.

For example, a menu screen 2 as illustrated in FIG. 2 is displayed in a display of the terminal device 10. When a parameter list button (B1) displayed in the menu screen 2 is pressed by a user, the terminal device 10 transmits a read request of a parameter to the industrial machine 20. In this case, for example, the terminal device 10 transmits a collective read request for all the parameters stored in the industrial machine 20 to the industrial machine 20.

Subsequently, in response to the read request from the terminal device 10, the industrial machine 20 transmits the parameters stored in a memory to the terminal device 10.

Here, there are a large number of parameters in the industrial machine 20. Therefore, when all the parameters stored in the industrial machine 20 are provided to the terminal device 10 for performing parameter editing, there is a risk that it may take a long time for a user of the terminal device 10 to find a parameter that the user wants to change, or a change omission of a parameter may occur.

On the other hand, there are multiple control modes in the industrial machine 20 for controlling an operation of the control target machine 28. Required parameters for each control mode are different from one control mode to another. Therefore, among the multiple parameters stored in the industrial machine 20, there are also parameters that are not required to be changed in a control mode that is currently set in the industrial machine 20.

Therefore, the industrial machine 20 performs a process in which, among the multiple parameters stored in the memory, parameters that can be changed by the terminal device 10 are sorted out according to a control mode that is currently set.

For example, there are multiple control modes 1, 2, 3, . . . and among these control modes, the control mode 1 is set in the industrial machine 20. In this case, the industrial machine 20 sorts out parameters (for example, parameter (A), parameter (C), parameter (H), . . . ) that correspond to the control mode 1 as the parameters that can be changed by the terminal device 10. Then, the industrial machine 20 transmits the sorted out parameter (A), parameter (C), parameter (H), . . . to the terminal device 10.

The terminal device 10 displays in the display the parameters obtained from the industrial machine 20. As a result, as illustrated in FIG. 2, the parameter (A), parameter (C), parameter (H), . . . that can be changed by the terminal device 10 in the control mode 1 are displayed in a list format in a parameter list screen 3 of the terminal device 10.

In this way, the industrial machine 20 sorted out parameters from the multiple parameters stored in the industrial machine 20 according to the control mode that is set in the industrial machine 20 and then provides the sorted out parameters to the terminal device 10. As a result, the number of the parameters that are provided to a user can be reduced, a parameter that the user wants to change can be easily formed, and a change omission is unlikely to occur, and thus, efficiency of the parameter editing can be improved. Further, by reducing the number of the parameters and then transmitting the parameters to the terminal device 10, communication traffic of the wireless communication can be reduced as compared to a case where the sorting out of the parameters is performed on the terminal device 10 side. Further, parameters that are not to be known by general users can be prevented from being stored in the terminal device 10.

Further, when an operation to change a parameter that is read from the industrial machine 20 is received from a user, the terminal device 10 transmits to the industrial machine 20 a write request of the parameter after the change.

For example, in the parameter list screen 3 illustrated in FIG. 2, when a field (B2) of the parameter (C) is selected and a change button (B3) is pressed, an edit screen (not illustrated in the drawings) of the parameter (C) is displayed. In the edit screen of the parameter (C), for example, when an operation to change the parameter (C) from "ccc" to "ddd" is received, the terminal device 10 transmits to the industrial machine 20 a write request indicating the change of the parameter (C) to "ddd." Then, the industrial machine 20 changes the parameter (C) stored in the memory from "ccc" to "ddd" according to the write request received from the terminal device 10.

Further, in the industrial machine system 1, information stored on the server 30 can be used to support the above-described parameter editing by the terminal device 10.

For example, when writing of a parameter to the industrial machine 20 is performed, the terminal device 10 transmits change information of the parameter to the server 30. The server 30 obtains the change information from the terminal device 10 and stores the change information as a change history in a memory. The server 30 can collect change information not only from the terminal device 10 illustrated in FIG. 1 but also from other terminal devices and store the change information as change histories.

Then, based on the multiple change histories stored in the memory, the server 30 generates support information that supports the parameter editing by the terminal device 10 and transmits the support information to the terminal device 10.

For example, suppose that the parameter (C) has been changed by the terminal device 10. In this case, the server 30 identifies a parameter that is related to the parameter (C), for example, a parameter that is highly likely to be changed together with the parameter (C) (here, the parameter (H)), from the multiple change histories stored in the memory. Then, the server 30 generates support information that prompts the user to change the parameter (H).

Based on such support information, for example, as illustrated in FIG. 2, the terminal device 10 displays a pop up support screen 5 on a change result screen 4 of the parameter (C), prompting the user to change the parameter (H). It is also possible that, when a "Yes" button (B4) of the support screen 5 is pressed, the terminal device 10 displays an edit screen of the parameter (H) in the display.

In this way, according to the industrial machine system 1, by providing information of a parameter related to a changed parameter to the terminal device 10, for example, when it is desirable to change multiple parameters, occurrence of a change omission of a parameter can be suppressed. Further, even for a user who is not familiar with the parameter editing, the parameter editing can be easily performed.

Example of Structure of Industrial Machine System

Figure 3:
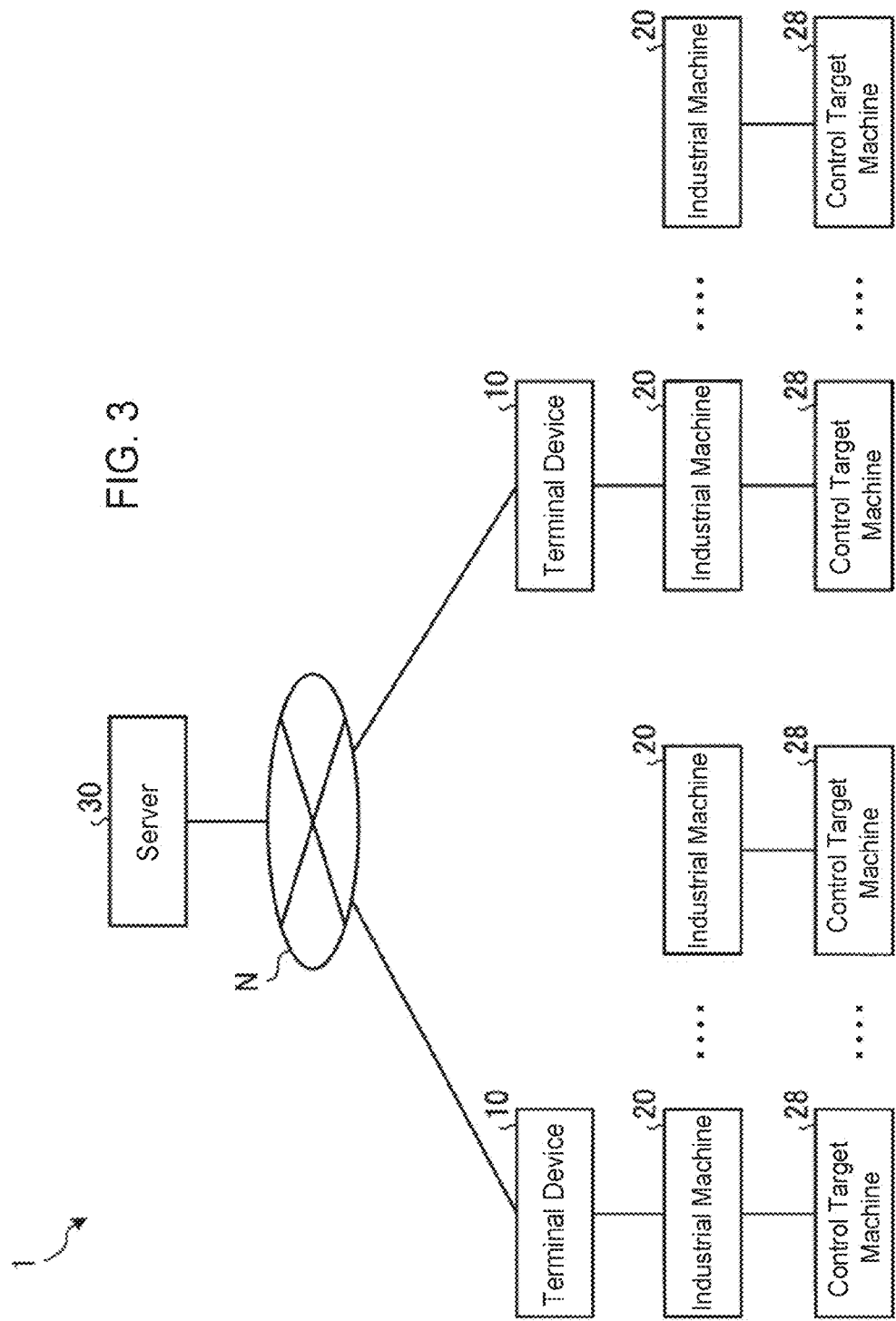
FIG. 3 illustrates an example of a structure of an industrial machine system according to an embodiment.

Next, an example of a structure of the above-described industrial machine system 1 is described. FIG. 3 illustrates an example of a structure of the industrial machine system 1 according to the present embodiment.

As illustrated in FIG. 3, the industrial machine system 1 includes multiple terminal devices 10, multiple industrial machines 20, multiple control target machines 28, and the server 30.

The terminal devices 10, for example, are portable terminals such as smart phones and tablets. The terminal devices 10 can be connected to the industrial machines 20 using near field wireless communication such as Bluetooth (registered trademark) or a wireless LAN (Local Area Network).

Further, the terminal devices 10 are connected to a network (N) using wireless communications such as 3G (Generation), 4G (Generation), LTE (Long Term Evolution) and GSM (registered trademark) (Global System for Mobile Communications) and are connected to the server 30 via the network (N).

In the present embodiment, the terminal devices 10 are described as portable terminals. However, the terminal devices 10 are not limited to portable terminals. For example, it is also possible that the terminal devices 10 are desktop PCs (Personal Computers) or the like.

The industrial machines 20, for example, are power conversion devices such as inverter devices, converter devices, and servo motor control devices. The control target machines 28 are electric motors such as servo motors or rotating electrical machines such as power generators.

Such industrial machines 20 each control an operation of a control target machine 28 based on a set control mode among multiple control modes and multiple parameters. For example, an inverter device as an industrial machine 20 has control modes such as "vector control" and "V/f control."

In the present embodiment, the industrial machines 20 are described as the power conversion devices. However, the industrial machines 20 are not limited to the power conversion devices. For example, it is also possible that the industrial machines 20 are robot control devices that control operations of robots, which are the control target machines 28.

The server 30 manages various kinds of information in the industrial machine system 1. For example, the server 30 obtains backup data of parameters of the industrial machines 20 from the terminal devices 10 and stores the backup data, and transmits the stored backup data to the terminal devices 10. Further, based on the stored information, the server 30 generates support information supporting the parameter editing by a terminal device 10 and generates abnormality countermeasure information that indicates change content of a parameter for resolving an abnormality occurring in an industrial machine 20.

Terminal Device

Figure 4:
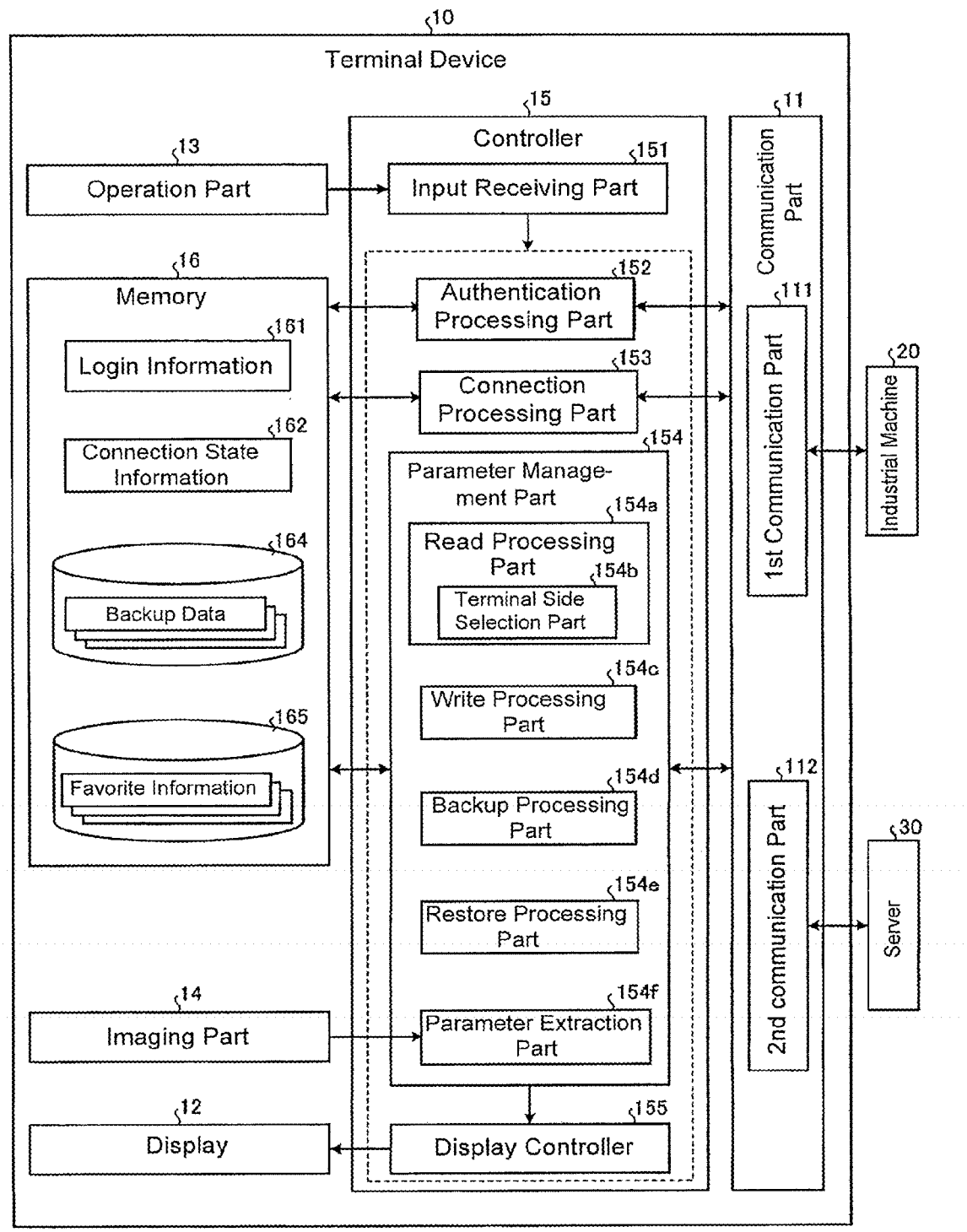
FIG. 4 illustrates an example of a structure of a terminal device.

Next, an example of a structure of a terminal device 10 is described with reference to FIG. 4. FIG. 4 illustrates an example of a structure of a terminal device 10. Connection relations between components of the terminal device 10 are not limited to connection relations indicated by arrows in FIG. 4.

As illustrated in FIG. 4, the terminal device 10 includes a communication part 11, a display 12, an operation part 13, an imaging part 14, a controller 15, and a memory 16.

The controller 15 includes an input receiving part 151, an authentication processing part 152, a connection processing part 153, a parameter management part 154, and a display controller 155. The parameter management part 154 includes a read processing part (154a), a write processing part (154c), a backup processing part (154d), a restore processing part (154e), and a parameter extraction part (154f). Further, the memory 16 stores login information 161, connection state information 162, a backup data group 164, and a favorite information group 165.

The communication part 11 is realized, for example, using a NIC (Network Interface Card) or the like. The communication part 11 includes a first communication part 111 and a second communication part 112. The first communication part 111 transmits information to and receives information from the industrial machines 20 by near field wireless communication. The second communication part 112 transmits information to and receives information from the server 30 by wireless communication via the network (N).

The display 12 is, for example, an LCD (Liquid Crystal Display) or an organic EL (Electro Luminescence) display, and displays various kinds of information. In the present embodiment, the display 12 is a touch panel type display. However, it is not necessarily required that the display 12 is a touch panel type display.

The operation part 13 is an input device that receives various operations from a user. In the present embodiment, the operation part 13 is a touch panel and is integrally formed with the display 12. However, it is also possible that the operation part 13 is realized using a keyboard, a mouse and the like.

The imaging part 14 is, for example, a camera. The imaging part 14 captures an image of a subject and outputs image data of the captured image to the parameter extraction part (154f).

The controller 15 includes, for example, a microcomputer and various circuits, the microcomputer having a CPU (Central Processing Unit), a ROM (Read Only Memory), a RAM (Random Access Memory), an input and output port and the like. The CPU of such a microcomputer realizes the control to be described later by reading and executing a program stored in the ROM.

The input receiving part 151, the authentication processing part 152, the connection processing part 153, the parameter management part 154 and the display controller 155, for example, are realized by the CPU by reading and executing the program. It is also possible that some or all of the input receiving part 151, the authentication processing part 152, the connection processing part 153, the parameter management part 154 and the display controller 155 are each realized using hardware such as an ASIC (Application Specific Integrated Circuit) or an FPGA (Field Programmable Gate Array).

Input Receiving Part

The input receiving part 151 perform is a process in which information of an input operation to a screen displayed in the display 12 is obtained from the operation part 13 and is passed to the authentication processing part 152, the connection processing part 153, the parameter management part 154 or the display controller 155.

For example, in a case where a login screen is displayed in the display 12, when user identification information (hereinafter, referred to as a user ID) and a password are input by a user, the input receiving part 151 passes the input information including the user ID and the password to the authentication processing part 152.

Authentication Processing Part

The authentication processing part 152 performs a user authentication process with the server 30. For example, when input information including a user ID and a password are obtained, the authentication processing part 152 transmits the obtained input information to the server 30. Further, when a user authentication result is obtained from the server 30, the authentication processing part 152 stores the login information 161 including the user ID, login date and time and the like in the memory 16.

When the user is authenticated by the server 30, it becomes possible for the terminal device 10 to cooperate with the server 30, for example, to upload backup data to and download backup data from the server 30, and to obtain support information or abnormality countermeasure information from the server 30. However, the present invention is not limited to this. It is also possible that the server 30 allows all terminal devices 10 using the industrial machine system 1 to upload and download backup data, and provides support information or abnormality countermeasure information to all the terminal devices 10.

Connection Processing Part

The connection processing part 153 transmits, to an industrial machine 20, a connection request for establishing a wireless communication connection with the industrial machine 20. The connection request includes, for example, identification information of the terminal device (hereinafter, referred to as a terminal ID), a user ID or the like. When the wireless communication connection with the industrial machine 20 is established, the connection processing part 153 stores in the memory 16 the connection state information 162 that includes identification information (hereinafter, referred to as an industrial machine ID) of the industrial machine 20 that is a connection destination, connection date and time, and the like.

However, a communication area of the near field wireless communication such as Bluetooth (registered trademark) is relatively small. Therefore, there is a possibility that, during an editing operation of a parameter of the industrial machine 20 by the terminal device 10, the connection state between the terminal device 10 and the industrial machine 20 is unintentionally disconnected.

Therefore, it is also possible that, in the terminal device 10, the connection processing part 153 monitors a radio wave intensity of the near field wireless communication that uses the first communication part 111, and when the radio wave intensity is below a threshold, the display controller 155 displays a predetermined notification information in the display 12. As a result, a situation in which the connection state between the terminal device 10 and the industrial machine 20 is unintentionally disconnected is less likely to occur. As the notification information, in addition to text information, graphic information or the like may also be adopted.

Read Processing Part

The read processing part (154a) transmits a read request of a parameter to the industrial machine 20. For example, when a user selects collective read to read all parameters stored in the industrial machine 20, the read processing part (154a) transmits a collective read request to the industrial machine 20.

Further, the read processing part (154a) includes a terminal side sorting part (154b) that sorts out parameters to be requested from the industrial machine 20 according to an input operation to the operation part 13.

For example, when a keyword is input to the operation part 13, the terminal side sorting part (154b) sorts out as read target parameters corresponding to the input keyword, for example, a parameter that contains the keyword in a name of the parameter.

Further, when an operation is performed to select one piece of favorite information from the favorite information group 165 stored in the memory 16, the terminal side sorting part (154b) sorts out as a read target parameters included in the selected favorite information.

Then, the read processing part (154a) transmits to the industrial machine 20 a read request of the parameter sorted out by the terminal side sorting part (154b).

In this way, the terminal side sorting part (154b) sorts out a parameter as a read target based on "keyword search" or "favorite information." As a result, the number of the parameters provided from the industrial machine 20 to the terminal device 10 can be reduced and thus, communication traffic can be reduced.

Further, when parameters are obtained from the industrial machine 20, the read processing part (154a) passes the obtained parameters to the display controller 155, and the display controller 155 lists the parameters received from the read processing part (154a) in the display 12.

Write Processing Part

When any one of the parameters read from the industrial machine 20 by the read processing part (154a) is changed by an input operation to the operation part 13, the write processing part (154c) transmits to the industrial machine 20 a write request including an identification number (hereinafter, referred to as a parameter number) of the changed parameter and a value of the parameter after the change.

Further, when a relevant parameter of the industrial machine 20 is changed by the write request, the write processing part (154c) transmits change information indicating change content of the parameter to the server 30. The change information includes, for example, change date and time, an industrial machine ID, a parameter number, values of the parameter before and after the change, a terminal ID, a user ID and the like.

Further, the write processing part (154c) can transmit a setting request of application information to the industrial machine 20. Here, the term "application information" refers to information regarding application of the industrial machine 20, for example, as "a water supply pump," "a conveyor," "an air supply and exhaust fan," "a compressor" and the like. When application information is set in the industrial machine 20, the write processing part (154c) transmits the set application information together with the industrial machine ID, the terminal ID, the user ID and the like to the server 30.

Backup Processing Part

The backup processing part (154d) obtains backup data of the multiple parameters stored in the industrial machine 20 from the industrial machine 20, and stores the obtained backup data in the memory 16.

Here, the backup processing part (154d) obtains from the industrial machine 20 backup data including difference values relative to initial values of the multiple parameters stored in the industrial machine 20.

As a result, as compared to a case where values of the parameters are obtained, a data amount of the backup data is reduced. Therefore, communication traffic of the backup process and a capacity of the memory 16 can be reduced.

When backup data is obtained from the industrial machine 20, the backup processing part (154d) adds backup date and time, the industrial machine ID, the terminal ID, the user ID and the like to the backup data and stores the backup data in the memory 16.

The backup processing part (154d) requests backup data from the industrial machine 20 including all the parameters stored in the industrial machine 20. However, the present invention is not limited to this. It is also possible that the backup processing part (154d) requests backup data from the industrial machine 20 including some of the parameters stored in the industrial machine 20, for example, only those parameters sorted out by the terminal side sorting part (154b).

Further, the backup processing part (154d) transmits (uploads) the backup data stored in the memory 16 to the server 30.

Restore Processing Part

Figure 9:
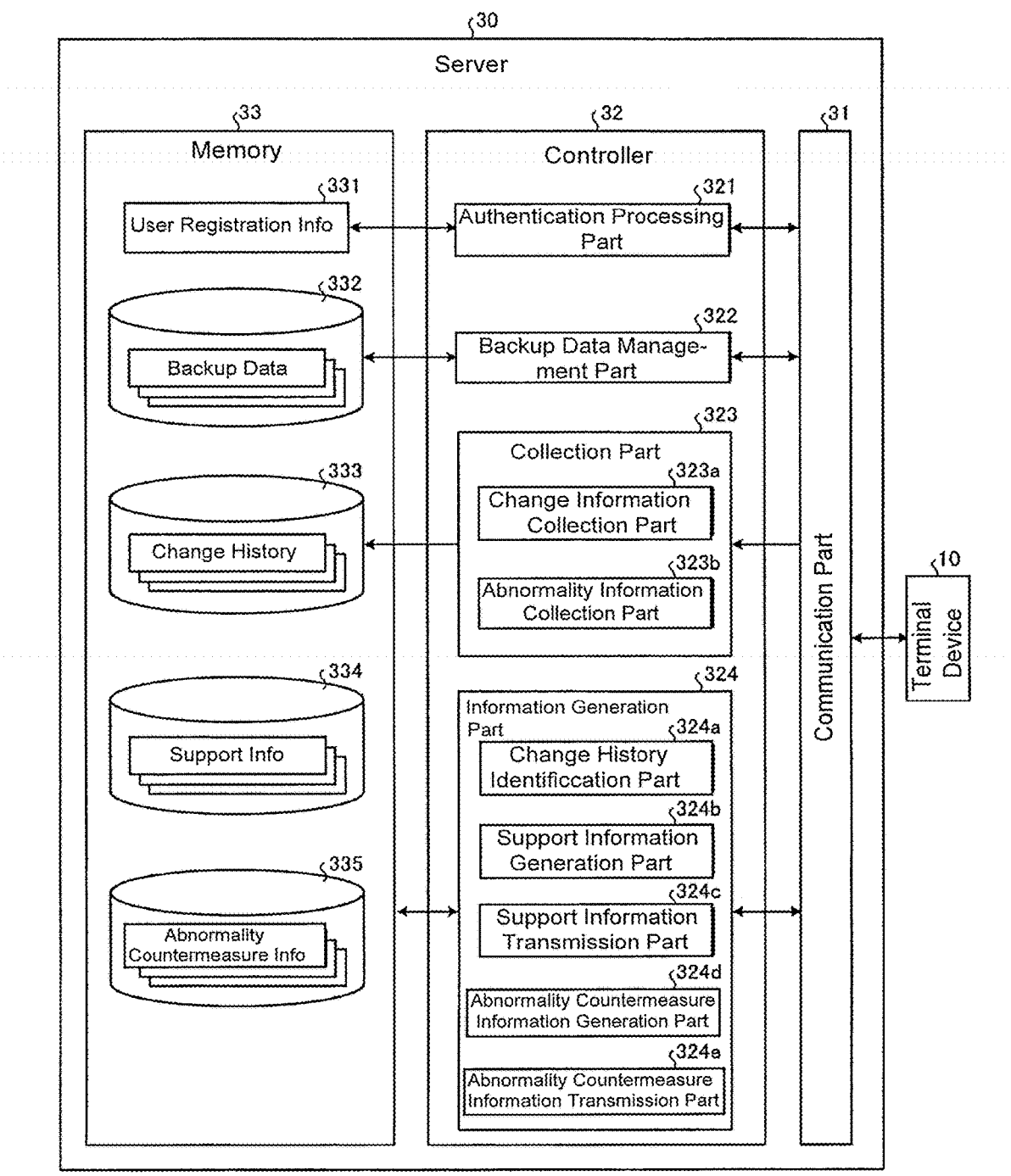
FIG. 9 illustrates an example of a structure of a server.

The restore processing part (154e) restores the industrial machine 20 using the backup data stored in the memory 16 or the backup data stored in a memory 33 of the server 30 (see FIG. 9).

Specifically, as described above, the backup data includes the difference values relative to the initial values of the parameters. The restore processing part (154e) transmits to the industrial machine 20 a restore request that includes, among the difference values included in the backup data, difference values of parameters other than parameters that depend on a capacity of the industrial machine 20.

A rated capacity (kVA) of each of the industrial machines 20, which are power conversion devices, may be different from one industrial machine 20 to another. By excluding parameters that depend on a capacity of an industrial machine 20 from write targets, when the restore processing part (154e) writes the backup data of one industrial machine 20 to another industrial machine 20 having a capacity different from the one industrial machine 20, a problem is less likely to occur.

The terminal device 10, for example, can store in the memory 16 a list of parameters that depend on the capacity of an industrial machine 20 and use such a list to exclude parameters that depend on the capacity of an industrial machine 20 from the parameters included in the backup data.

Further, the restore processing part (154e) has a first restore mode and a second restore mode. The first restore mode is a mode in which a restore request that includes, among the difference values included in the backup data, difference values of parameters other than parameters that depend on the capacity of an industrial machine 20 is transmitted to the industrial machine 20. Further, the second restore mode is a mode in which a restore request that includes all the difference values included in the backup data is transmitted to the industrial machine 20.

The restore processing part (154e) selects one of the first restore mode and the second restore mode according to an input operation to the operation part 13. As a result, when the backup data of one industrial machine 20 is written to another industrial machine 20 having the same capacity as the one industrial machine 20, all the parameters including the parameters that depend on the capacity can be written.

Parameter Extraction Part

The parameter extraction part (154f) extracts, from a captured image of a control target machine 28, a parameter related to the control target machine 28 among the parameters that can be changed by the terminal device 10.

For example, when a control target machine 28 is a motor, parameters such as a type and a capacity of the motor and the like may be displayed in the motor. When a captured image of a control target machine 28 is obtained from the imaging part 14, by performing character recognition processing such as OCR (Optical Character Recognition) with respect to the obtained captured image, the parameter extraction part (154f) extracts parameters such as the type and the capacity of the motor and the like. Then, the parameter extraction part (154f) passes the extracted parameters to the write processing part (154c), and the write processing part (154c) transmits a write request of the parameters extracted by the parameter extraction part (154f) to the industrial machine 20.

In this way, by extracting the parameters related to the control target machine 28 from the captured image of the control target machine 28 and writing the parameters to the industrial machine 20, an editing operation of the parameters related to the control target machine 28 can be simplified.

Display Controller

The display controller 155 displays various kinds of information in the display 12. For example, the display controller 155 displays parameters read from an industrial machine 20 in a list format in the display 12.

Memory

The memory 16 is realized, for example, by a RAM (Random Access Memory), a semiconductor memory device such as a flash memory, or a storage device such as a hard disk or an optical disk. Such a memory 16 stores the login information 161, the connection state information 162, the backup data group 164, and the favorite information group 165.

The login information 161 is information that includes a user ID, login date and time, and the like. The connection state information 162 is information that includes the industrial machine ID of an industrial machine 20, which is a connection destination, connection date and time, and the like. The backup data group 164 includes multiple sets of backup data. The backup data is data that includes difference values relative to initial values of multiple parameters stored in an industrial machine 20, backup date and time, an industrial machine ID, a terminal ID, a user ID and the like. The favorite information group 165 includes multiple pieces of favorite information. The favorite information is information that includes one or more parameters registered in the past by a user.

Industrial Machine

Figure 5:
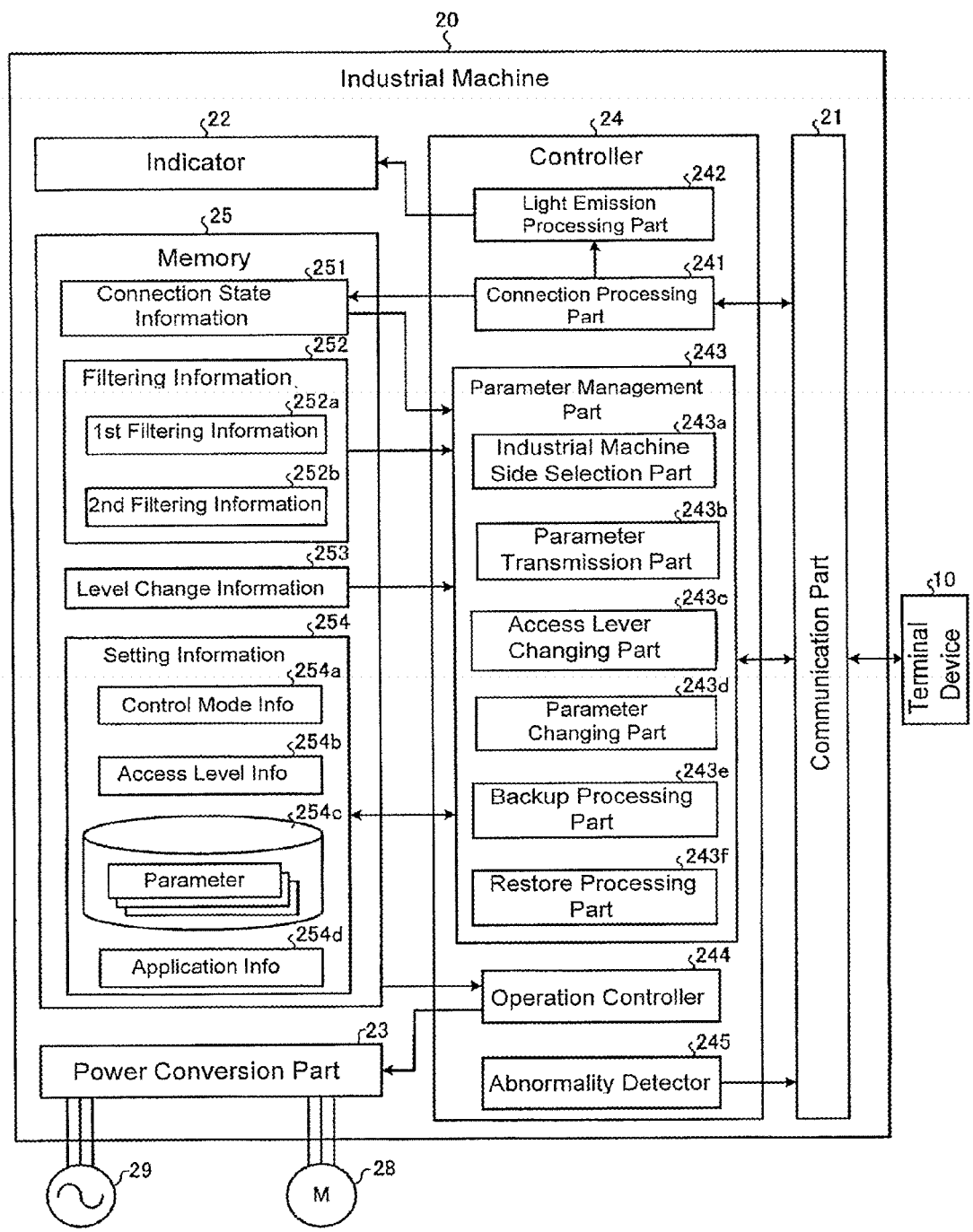
FIG. 5 illustrates an example of a structure of an industrial machine.

Next, an example of a structure of an industrial machine 20 is described with reference to FIG. 5. FIG. 5 illustrates an example of a structure of an industrial machine 20. FIG. 5 illustrates an example of a structure of an industrial machine 20 as a power conversion device. Further, connection relations between components of the industrial machine 20 are not limited to connection relations indicated by arrows in FIG. 5.

As illustrated in FIG. 5, the industrial machine 20 includes a communication part 21, an indicator 22, a power conversion part 23, a controller 24, and a memory 25.

The controller 24 includes a connection processing part 241, a light emission processing part 242, a parameter management part 243, an operation controller 244, and an abnormality detector 245. The parameter management part 243 includes an industrial machine side sorting part (243a), a parameter transmission part (243b), an access level changing part (243c), a parameter changing part (243d), a backup processing part (243e), and a restore processing part (243f).

The memory 25 stores connection state information 251, filtering information 252, level change information 253, and setting information 254. Further, the filtering information 252 includes first filtering information (252a) and second filtering information (252b). The setting information 254 includes control mode information (254a), access level information (254b), a parameter group (254c) that includes multiple parameters, and application information (254d).

The communication part 21 is realized, for example, using a NIC or the like. The communication part 21 transmits information to and receives information from a terminal device 10 by near field wireless communication.

The indicator 22, for example, is formed to include one or more lamps. Each lamp is formed, for example, using an LED (Light Emitted Diode) or the like. Such an indicator 22 turns on a lamp or causes a lamp to blink according to control of the light emission processing part 242.

The power conversion part 23, for example, is formed to include multiple switching elements. Each of the switching elements, for example, is a semiconductor switching element such as a MOSFET (Metal-Oxide-Semiconductor Field-Effect Transistor) or an IGBT (Insulated Gate Bipolar Transistor). The power conversion part 23 controls an operation of a rotating electrical machine, which is a control target machine 28, by converting power supplied from a power source 29 by switching the switching elements.

The power conversion part 23 is not limited to have the above-described structure as long as the power conversion part 23 is structured capable of outputting AC power for driving a rotating electrical machine.

The controller 24 includes, for example, a microcomputer and various circuits, the microcomputer having a CPU, a ROM, a RAM, an input and output port and the like. The CPU of such a microcomputer realizes the control to be described later by reading and executing a program stored in the ROM.

The light emission processing part 242, the connection processing part 241 and the parameter management part 243, for example, are realized by the CPU by reading and executing the program. It is also possible that some or all of the light emission processing part 242, the connection processing part 241 and the parameter management part 243 are each realized using hardware such as an ASIC or an FPGA.

Connection Processing Part

When a connection request is received from a terminal device 10, the connection processing part 241 performs processing to establish near field wireless communication with the terminal device 10. For example, after a predetermined connection process is performed, the connection processing part 241 transmits to the terminal device 10 a connection result indicating that wireless communication connection with the terminal device 10 has been established. As a result, the near field wireless communication with the terminal device 10 is established. The connection result includes the industrial machine ID and the like.

When the wireless communication connection with the terminal device 10 is established, the connection processing part 241 stores in the memory 25 the connection state information 251 that includes the terminal ID of the terminal device 10, which is the connection destination, a user ID, connection date and time, and the like.

When the wireless communication connection with the terminal device 10 is established, the connection processing part 241 instructs the light emission processing part 242 to cause the indicator 22 to emit light. Further, when the wireless communication connection with the terminal device 10 is disconnected, the connection processing part 241 deletes the connection state information 251 stored in the memory 25.

Light Emission Processing Part

The light emission processing part 242 causes a lamp of the indicator 22 to emit light according to an instruction from the connection processing part 241. That is, when the wireless communication connection with the terminal device 10 is established by the connection processing part 241, the light emission processing part 242 causes a lamp of the indicator 22 to emit light.

As a result, for example, when multiple industrial machines 20 are positioned close to each other, the industrial machine 20 that is the connection destination can be easily recognized by the user of the terminal device 10.

It is also possible that the light emission processing part 242 causes the indicator 22 to emit light before the wireless communication connection with the terminal device 10 is established, that is, during the process of the connection with the terminal device 10. As a result, the industrial machine 20 that is the connection destination can be promptly recognized by the user of the terminal device 10.

Industrial Machine Side Sorting Part

The industrial machine side sorting part (243a) performs a sorting process in which, among the multiple parameters that are stored as the parameter group (254c) in the memory 25, parameters that can be changed by the terminal device 10 are sorted out according to a control mode that is set in the industrial machine 20.

For example, the industrial machine side sorting part (243a) can perform the sorting process using the control mode information (254a) and the first filtering information (252a) stored in the memory 25.

The control mode information (254a) is information that indicates a control mode that is currently set in the industrial machine 20 among the multiple control modes that can be set in the industrial machine 20. Here, the term "control mode" refers to information regarding a control method of the control target machine 28. For example, there are "vector control," "V/f control" and the like. The first filtering information (252a) is information in which control modes and parameters corresponding to each of the control modes are associated with each other.

Here, an example of the first filtering information (252a) is described with reference to FIG. 6. FIG. 6 illustrates an example of the first filtering information (252a).

As illustrated in FIG. 6, the first filtering information (252a) includes a "control mode" item and a "parameter" item. The "control mode" item stores information that identifies each of the control modes. The "parameter" item stores information that identifies parameters corresponding to each of the control modes, for example, parameters that are used in each of the control modes. For example, a parameter (A), a parameter (C), a parameter (D), a parameter (H), . . . are stored as parameters that correspond to a "control mode 1."

To facilitate understanding, FIG. 6 illustrates an example of a case where names of control modes and parameters are respectively stored in the "control mode" item and the "parameter" item. However, it is also possible that information such as identification numbers that allow control modes and parameters to be identifiable is stored in the "control mode" item and the "parameter" item. Further, it is also possible that the first filtering information (252a) is information in which one or more corresponding control modes are associated with each parameter.

When a read request of parameters is received from a terminal device 10, the industrial machine side sorting part (243a) uses the control mode information (254a) and the first filtering information (252a) to identify parameters corresponding to a current control mode. For example, when the current control mode is the "control mode 1," the industrial machine side sorting part (243a) identifies the parameter (A), the parameter (C), the parameter (D), the parameter (H), . . . that correspond to the "control mode 1."

Then, the industrial machine side sorting part (243a) extracts, from the parameter group (254e) stored in the memory 25, parameters that are identified using the control mode information (254a) and the first filtering information (252a) among parameters that are requested to be read by a read request, and passes the parameters to the parameter transmission part (243b).

For example, when collective read of all parameters is requested, the parameter (A), the parameter (C), the parameter (D), the parameter (H), . . . are extracted from the parameter group (254c) and are passed to the parameter transmission part (243b). Further, when the parameter (A), a parameter (B) and the parameter (C) are sorted out by the terminal side sorting part (154b) of the terminal device 10, the parameter (A) and the parameter (C) are extracted from the parameter group (254c) and are passed to the parameter transmission part (243b).

The industrial machine side sorting part (243a) can sort out parameters that can be changed by the terminal device 10 according to a set control mode among multiple control modes and a set access level among multiple access levels.

In such a case, the industrial machine side sorting part (243a) performs a sorting process of parameters by further using the access level information (254b) and the second filtering information (252b). The access level information (254b) is information that indicates an access level that is currently set in the industrial machine 20 among the multiple access levels that can be set in the industrial machine 20. The second filtering information (252b) is information in which access levels and parameters corresponding to each of the access levels are associated with each other.

Here, an example of the second filtering information (252b) is described with reference to FIG. 7. FIG. 7 illustrates an example of the second filtering information (252b).

As illustrated in FIG. 7, the second filtering information (252b) includes an "access level" item and a "parameter" item. The "access level" item stores information that identifies each of the access levels. The "parameter" item stores information that identifies parameters corresponding to each of the access levels. For example, the parameter (A), the parameter (H), . . . are stored as parameters that correspond to an "access level 1."

Similar to the first filtering information (252a), it is also possible that information such as identification numbers that allow access levels and parameters to be identifiable is stored in the "access level" item and the "parameter" item. Further, it is also possible that the second filtering information (252b) is information in which one or more corresponding access levels are associated with each parameter.

When a read request of parameters is received from a terminal device 10, the industrial machine side sorting part (243a) uses the control mode information (254a), the access level information (254b), the first filtering information (252a) and the second filtering information (252b) to identify parameters corresponding to a current control mode and a current access level.

For example, when the current control mode is the "control mode 1" and the current access level is the "access level 1," the industrial machine side sorting part (243a) identifies the parameter (A), parameter (H), . . . that correspond to the "control mode 1" and correspond to the "access level 1."

Then, the industrial machine side sorting part (243a) extracts, from the parameter group (254c) stored in the memory 25, parameters that are identified using the control mode information (254a) and the first filtering information (252a) among parameters that are requested to be read by a read request, and passes the parameters to the parameter transmission part (243b).

The sorting process performed by the industrial machine side sorting part (243a) is not limited to the above example. For example, when multiple parameters have dependent relationship between them, it is also possible that, as a condition that a superior parameter is sorted out as a parameter that can be changed by a terminal device, the industrial machine side sorting part (243a) sorts out a subordinate parameter that depends on the superior parameter as a parameter that can be changed by the terminal device.

Parameter Transmission Part

The parameter transmission part (243b) transmits a list of parameters that are sorted out by the industrial machine side sorting part (243a) to the terminal device 10 by wireless communication.

Access Level Changing Part

The access level changing part (243c) changes a currently set access level according to a terminal ID obtained from a terminal device 10.

For example, the access level changing part (243c) identifies a terminal ID of a terminal device 10 that is currently connected from the connection state information 251 stored in the memory 25 and changes an access level using the identified terminal ID and the level change information 253. The level change information 253 is information in which a terminal ID and an access level are associated with each other.

When the access level that corresponds to the identified terminal ID is different from the current access level, the access level changing part (243c) changes the current access level to the access level that corresponds to the identified terminal ID by updating the access level information (254b) stored in the memory 25.

For example, when the current access level is the "access level 1" and the access level that corresponds to the terminal ID is an "access level 2," the access level changing part (243c) changes the access level from the "access level 1" to the "access level 2." As a result, the industrial machine side sorting part (243a) can sort out parameters that correspond to the access level 2 as the parameters that can be changed by the terminal device 10, and can sort out the parameter (B) and the parameter (D), which are excluded for the access level 1, as the parameters that can be changed by the terminal device 10.

In the above example, the access level changing part (243c) changes the access level according to a terminal ID. However, it is also possible that the access level changing part (243c) changes the access level according to a user ID.

In this case, the industrial machine 20 can store information in which a user ID and an access level are associated with each other as the level change information 253 in the memory 25. Further, the access level changing part (243c) can identify a user ID by referring to the connection state information 251 stored in the memory 25 and use the identified user ID and the level change information 253 to change the access level.

Further, it is also possible that the access level changing part (243c) changes the access level according to a terminal ID and a user ID. In this case, the industrial machine 20, for example, can store information in which a terminal ID, a user ID and an access level are associated with each other as the level change information 253 in the memory 25.

Here, an example of such level change information 253 is described with reference to FIG. 8. FIG. 8 illustrates an example of the level change information 253.

As illustrated in FIG. 8, in the level change information 253, for example, a terminal ID="001," a user ID="xx1" and an access level="access level 1" are associated with each other. Further in the level change information 253, a terminal ID="002," the user ID="xx1" and the access level="access level 2" are associated with each other.

When the terminal ID="001" and the user ID="xx1" are identified from the connection state information 251 and when the current access level is the "access level 1," the access level changing part (243c) does not change the access level. On the other hand, when the terminal ID="002" and the user ID="xx1" are identified from the connection state information 251 and when the current access level is the "access level 1," the access level changing part (243c) changes the access level to the "access level 2."

In this way, even for the same user, the access level changing part (243c) can cause the access level after the change to be different depending on a terminal device 10 that the user is currently using.

The level change information 253 may be stored in the memory 25 in advance, or may be obtained afterword from the terminal devices 10, the server 30 and other devices via the network or the like and stored in the memory 25.

Further, when the wireless communication connection with the terminal device 10 is disconnected, the access level changing part (243*c*) may perform processing to revert a changed access level to the access level before the change.

Parameter Changing Part

When a write request is received from a terminal device 10, the parameter changing part (243*d*) changes a parameter stored in the memory 25 according to the received write request.

Further, when a setting request of application information is received from a terminal device 10, the parameter changing part (243*d*) also performs a process to store the received application information as the application information (254*d*) in the memory 25.

Based on the application information (254*d*) stored in the memory 25, the parameter changing part (243*d*) changes the multiple parameters stored in the memory 25 to parameters that correspond to the application information (254*d*). As a result, a user can easily perform appropriate parameter setting according to an intended use of the industrial machine 20.

Backup Processing Part

When a backup request is received from a terminal device 10, the backup processing part (243*e*) transmits backup data of the multiple parameters stored in the memory 25 to the terminal device 10.

As described above, the backup processing part (243*e*) transmits the backup data that includes the difference values relative to the initial values of the multiple parameters stored in the memory 25 to the terminal device 10. As a result, as compared to the case where the values of the parameters are obtained, the data amount of the backup data can be reduced.

Restore Processing Part

When a restore request is received from a terminal device 10, the restore processing part (243*f*) updates the multiple parameters stored in the memory 25 according to the received restore request.

Operation Controller

The operation controller 244 controls an operation of a rotating electrical machine, which is a control target machine 28, by controlling the power conversion part 23 based on the control mode information (254*a*) and the multiple parameters included in the parameter group (254*c*). For example, the operation controller 244 controls the power conversion part 23 based on a control mode such as the "vector control" or the "V/f control" and multiple parameters such as a "frequency command," a "acceleration time," a "deceleration time" and a "stopping method."

Further, when the wireless communication connection with the terminal device 10 is disconnected, the operation controller 244 controls the power conversion part 23 to perform a process to stop the operation of the control target machine 28.

In this way, when the wireless communication connection with the terminal device 10 is disconnected, by stopping the operation, for example, a situation in which the control target machine 28 in an uncontrolled state continues to operation can be avoided.

Whether or not the wireless communication connection with the terminal device 10 is disconnected can be determined, for example, based on whether or not the connection state information 251 is stored in the memory 25. It is also possible that the operation controller 244 determines whether or not the wireless communication connection with the terminal device 10 is disconnected based on the radio wave intensity of the near field wireless communication.

Abnormality Detector

When an abnormality occurring in the industrial machine 20 is detected, the abnormality detector 245 transmits to the terminal device 10 abnormality information that includes an abnormality ID that identifies the detected abnormality, date and time when the abnormality occurred, the industrial machine ID, and the like. Examples of the content of the abnormality include a transistor overload abnormality, an inverter overload abnormality, a current offset abnormality and the like.

Memory

The memory 25 is realized, for example, by a RAM, a semiconductor memory device such as a flash memory, or a storage device such as a hard disk or an optical disk. Such a memory 25 stores the connection state information 251, the first filtering information (252*a*), the second filtering information (252*b*), the level change information 253, the control mode information (254*a*), the access level information (254*b*), the parameter group (254*c*), and the application information (254*d*).

The connection state information 251 is information that includes a terminal ID of a terminal device 10, which is a connection destination, a user ID, connection date and time, and the like. The first filtering information (252*a*) is information in which the control modes and the corresponding parameters are associated with each other. The second filtering information (252*b*) is information in which the access levels and the corresponding parameters are associated with each other. The level change information 253 is information in which, for example, an access level is associated with a terminal ID and a user ID. The application information (254*d*) is information regarding the application of the industrial machine 20.

The control mode information (254*a*) is information that indicates a control mode that is currently set in the industrial machine 20 among the multiple control modes that can be set in the industrial machine 20. The access level information (254*b*) is information that indicates an access level that is currently set in the industrial machine 20 among the multiple access levels that can be set in the industrial machine 20. The parameter group (254*c*) is information that includes multiple parameters.

Server

Next, an example of a structure of the server 30 is described with reference to FIG. 9. FIG. 9 illustrates an example of a structure of the server 30. Connection relations between components of the server 30 are not limited to connection relations indicated by arrows in FIG. 9.

As illustrated in FIG. 9, the server 30 includes a communication part 31, a controller 32, and a memory 33. The controller 32 includes an authentication processing part 321, a backup data management part 322, a collection part 323, and an information generation part 324. The collection part 323 includes a change information collection part (323*a*) and an abnormality information collection part (323*b*). The information generation part 324 includes a change history identification part (324*a*), a support information generation part (324*b*), a support information transmission part (324*c*), an abnormality countermeasure information generation part (324*d*), and an abnormality countermeasure information transmission part (324*e*).

Further, the memory 33 stores user registration information 331, a backup data group 332, a change history group 333, a support information group 334, and an abnormality countermeasure information group 335.

The communication part 31 is realized, for example, using a NIC or the like. The communication part 31 transmits information to and receives information from a terminal device 10 by wireless communication via the network (N).

The controller 32 includes, for example, a microcomputer and various circuits, the microcomputer having a CPU, a ROM, a RAM, an input and output port and the like. The CPU of such a microcomputer realizes the control to be described later by reading and executing a program stored in the ROM.

The authentication processing part 321, the backup data management part 322, the collection part 323 and the information generation part 324, for example, are realized by the CPU by reading and executing the program. It is also possible that some or all of the authentication processing part 321, the backup data management part 322, the collection part 323 and the information generation part 324 are each realized using hardware such as an ASIC or an FPGA.

Authentication Processing Part

The authentication processing part 32 performs a user authentication process with a terminal device 10. For example, when a user ID and a password are received from a terminal device 10, the authentication processing part 321 determines whether or not the received pair of the user ID and the password is included in the user registration information 331. Then, when the received pair of the user ID and the password is included in the user registration information 331, the authentication processing part 321 transmits to the terminal device 10 a notification indicating that the terminal device 10 is authenticated.

Backup Data Management Part

According to an upload request from a terminal device 10, the backup data management part 322 stores backup data uploaded from the terminal device 10 in the memory 33. Further, according to a download request from a terminal device 10, the backup data management part 322 selects specified backup data from the backup data group 332 and transmits the backup data to the terminal device 10.

Change Information Collection Part

The change information collection part (323a) obtains change information of a parameter from a terminal device 10 and stores the change information as a change history in the memory 33.

The change information collection part (323a) collects change information from multiple terminal devices 10. Therefore, change histories of parameters due to multiple terminal devices 10 are stored in the memory 33.

Further, when application information of an industrial machine 20, to which a terminal device 10 is connected, is obtained from the terminal device 10, the change information collection part (323a) also performs a process to store in the memory 33 the obtained application information in association with one or more change histories.

For example, the change information collection part (323a) associates the obtained application information with a change history that includes an industrial machine ID that matches an industrial machine ID that is transmitted together with the application information.

Abnormality Information Collection Part

The abnormality information collection part (323b) obtains, from a terminal device 10, abnormality information that indicates the content of an abnormality occurring in an industrial machine 20, and stores in the memory 33 the abnormality information in association with one or more change histories.

Here, the content of a change history of a parameter stored in the memory 33 is described with reference to FIG. 10. FIG. 10 illustrates an example of a change history of a parameter.

As illustrated in FIG. 10, the change history includes, for example, a "date and time" item, an "industrial machine ID" item, a "type" item, an "application information" item, a "terminal ID" item, a "user ID" item, a "parameter number" item, a "before change" item, an "after change" item and an "abnormality information" item. The "date and time" item stores information that indicates date and time when change information is obtained. The "industrial machine ID" item stores an industrial machine ID of an industrial machine 20 of which a parameter is changed. The "type" item stores a type of an industrial machine 20 of which a parameter is changed. The type, for example, can be identified from the industrial machine ID. The "application information" item stores application information that is set in an industrial machine 20 of which a parameter is changed.

Further, the "terminal ID" item stores a terminal ID of a terminal device 10 that is a transmission source of the change information. The "user ID" item stores a user ID of a user of the terminal device 10 that is the transmission source of the change information. The "parameter number" item stores a parameter number of a parameter that is changed. The "before change" item stores a value of a parameter before the parameter is changed. The "after change" item stores a value of a parameter after the parameter is changed. The "abnormality information" item stores an abnormality ID.

When abnormality information is obtained from a terminal device 10, the abnormality information collection part (323b) stores an abnormality ID included in the obtained abnormality information in the "abnormality information" item of a change history that matches the obtained abnormality information, for example, in date and time and in industrial machine ID. In this way, the abnormality information collection part (323b) associates the abnormality information with the change history.

Change History Identification Part

When change information of a parameter is obtained from a terminal device 10, based on the multiple change histories stored in the memory 33, the change history identification part (324a) identifies one or more parameter change histories related to the parameter associated with the obtained change information.

Figures 11, 12:
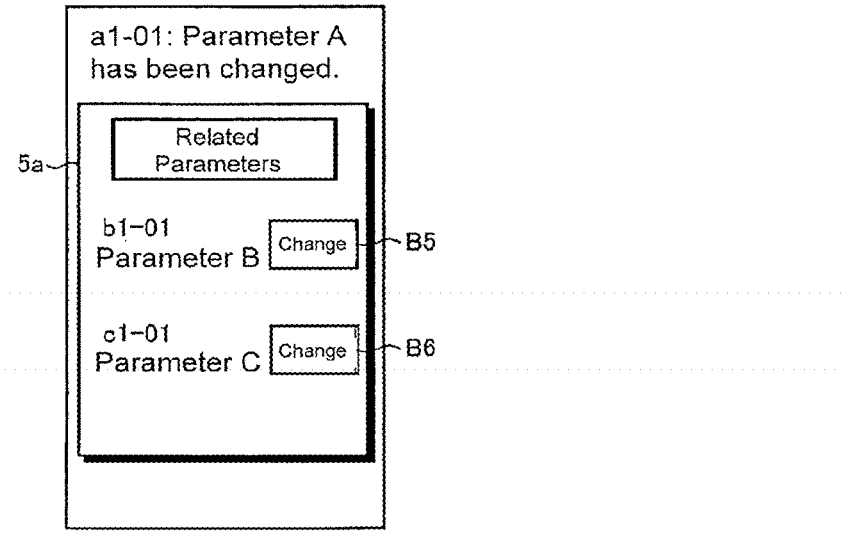
FIG. 11 illustrates an example of an identification process of a change history.
FIG. 12 illustrates an example of a support screen that is displayed in a display of a terminal device based on support information.

Here, an example of an identification process of a change history performed by the change history identification part (324a) is described with reference to FIG. 11. FIG. 11 illustrates an example of an identification process of a change history.

Based on the multiple change histories stored in the memory 33, the change history identification part (324a) identifies a parameter associated with the obtained change history (that is, a parameter that is identified by a parameter number included in the change history) and a parameter having a change record.

For example, as illustrated in FIG. 11, a change history (333a) that includes date and time="2015/11/01 10:01," an industrial machine ID="zzz3," application information="A1," a terminal ID="003" and a parameter number="a1-01," and a change history (333b) that includes date and time="2015/11/01 10:02," an industrial machine ID="zzz3," application information="A1," a terminal ID="003" and a parameter number="b1-01" are stored in the memory 33. This indicates that, with respect to an industrial machine 20 having an industrial machine ID="zzz3," a parameter having a parameter number="a1-01" was changed by a terminal device 10 having a terminal ID="003," and thereafter, a parameter having a parameter number="b1-01" was changed by the terminal device 10.

Further, a change history (333c) that includes date and time="2015/11/03 17:10," an industrial machine ID="zzz6," application information="A2," a terminal ID="006" and a parameter number="c1-01," and a change history (333d) that includes date and time="2015/11/03 17:11," an industrial machine ID="zzz6," application information="A2," a terminal ID="006" and a parameter number="a1-01" are stored in the memory 33. This indicates that, with respect to an industrial machine 20 having an industrial machine ID="zzz6," a parameter having a parameter number="c1-01" was changed by a terminal device 10 having a terminal ID="006," and thereafter, the parameter having the parameter number="a1-01" was changed by the terminal device 10.

When change information associated with the parameter having the parameter number="a1-01" is obtained from a terminal device 10, the change history identification part (324a) first identifies the change histories (333a, 333d) associated with the parameter having the parameter number="a1-01."

Subsequently, the change history identification part (324a) identifies the other change histories (333b, 333c) that include date and time close (for example, within one hour before or after, within the same log in period, the same date, and the like) to the date and time included in each of the identified change histories (333a, 333d) and include an industrial machine ID and a terminal ID that are the same as the industrial machine ID and the terminal ID included in the change histories (333a, 333d). As a result, the change histories (333b, 333c) of the parameters that respectively have the parameter number="b1-01" and the parameter number="c1-01" and are related to the parameter having the parameter number="a1-01" are identified.

Without being limited to the above-described example, it is also possible that, based on multiple pieces of application information stored in the memory 33 and one or more change histories associated with such application information, the change history identification part (324a) identifies one or more parameter change histories related to the obtained application information.

For example, when the application information="A1" is obtained, the change history identification part (324a) identifies the change histories (333a, 333b) illustrated in FIG. 11 as the related change histories.

It is also possible that the change history identification part (324a) identifies one or more parameter change histories related to a parameter associated with the obtained change information, from change histories of industrial machines 20 of the same type as the industrial machine 20 associated with the obtained change information, among the multiple change histories stored in the memory 33.

Support Information Generation Part

Based on the multiple change histories stored in the memory 33, the support information generation part (324b) generates support information that supports the parameter editing by a terminal device 10.

For example, based on a change history identified by the change history identification part (324a), the support information generation part (324b) generates support information that includes information about a parameter related to a parameter associated with change information.

Here, an example of support information generated by the support information generation part (324b) is described with reference to FIG. 12. FIG. 12 illustrates an example of a support screen that is displayed on the display 12 of a terminal device 10 based on support information.

The support information generation part (324b), for example, generates support information such that a support screen (5a) illustrated in FIG. 12 is displayed in the display 12 of the terminal device 10. As illustrated in FIG. 12, the support screen (5a) includes parameter numbers and names of parameters that are identified as related parameters by the change history identification part (324a) and change buttons (B5, B6) for transitioning to edit screens of the related parameters.

From the support screen (5a), a user of the terminal device 10 can easily understand that the parameter (B) and the parameter (C) are related to the parameter (A) that has been changed. Further, by pressing the buttons (B5, B6), the user can easily perform the transition to the edit screens of the parameter (B) and the parameter (C).

Further, based on the multiple change histories stored in the memory 33, the support information generation part (324b) can also determine an order of priority for each of two or more parameters identified by the change history identification part (324a), and generate support information that includes the determined orders of priority and the two or more parameters identified by the change history identification part (324a).

For example, when the parameters that respectively have the parameter number="b1-01" and the parameter number="c1-01" are identified by the change history identification part (324a), for each of the identified parameters "b1-01" and "c1-01," the support information generation part (324b) identifies, as a degree of relevance, the number of change histories that are identified by the change history identification part (324a). Then, the support information generation part (324b) prioritizes the parameters "b1-01" and "c1-01" in a descending order of the degree of relevance, that is, in a descending order of the number of the change histories identified by the change history identification part (324a).

For example, suppose that 100 change histories for the parameter number="b1-01" are identified by the change history identification part (324a) and 50 change histories for the parameter number="c1-01" are identified by the change history identification part (324a). In this case, the support information generation part (324b) ranks the parameter having the parameter number="b1-01" first in priority, and ranks the parameter having the parameter number="c1-01" second in priority. Then, the support information generation part (324b) generates support information that includes the determined orders of priority and the two or more parameters identified by the change history identification part (324a).

When the support information is obtained, the display controller 155 of the terminal device 10 displays the two or more parameters included in the obtained support information based on the orders of priority included in the support information. For example, when the parameters that respectively have the parameter number="b1-01" and the parameter number="c1-01" and the orders of priority that the parameter having the parameter number="b1-01" is ranked first in priority and the parameter having the parameter number="c1-01" is ranked second in priority are included in the support information, the display controller 155 displays, in this order, a screen that allows the parameter having the parameter number="b1-01" to be edited and a screen that allows the parameter having the parameter number="c1-01" to be edited.

Figures 13, 14:
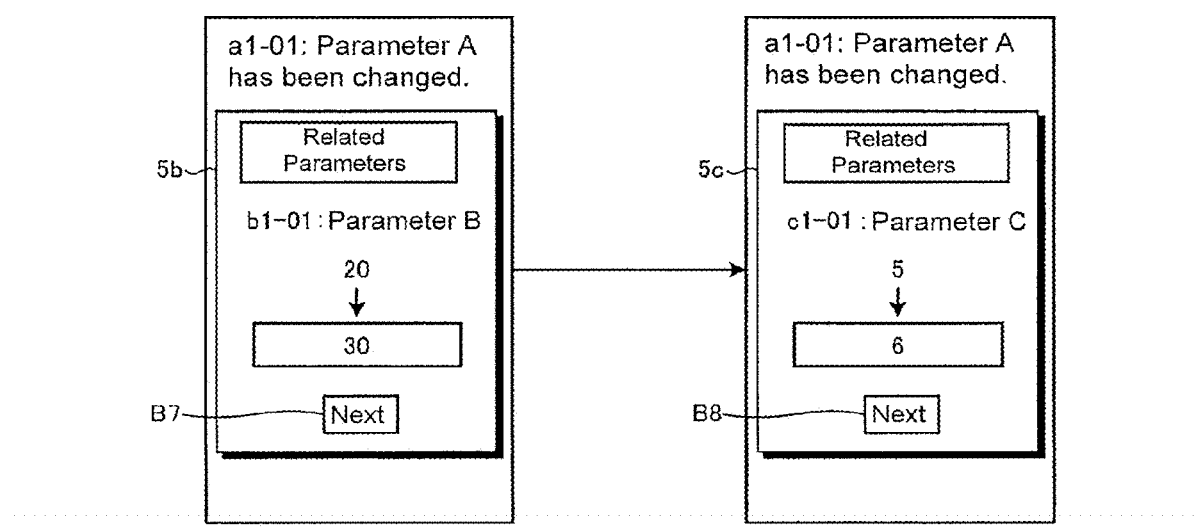
FIG. 13 illustrates another example of a support screen.
FIG. 14 illustrates an example of an abnormality countermeasure information generation process.

Here, an example of the support information in such a case is described with reference to FIG. 13. FIG. 13 illustrates another example of a support screen.

As illustrated in FIG. 13, in the display 12 of the terminal device 10, first, a support screen (5b) is displayed that allows the parameter that has the parameter number="b1-01" and is ranked first in priority to be edited. The support screen (5b) includes the parameter number, the name and the value of the parameter having the parameter number="b1-01," an input field for inputting an "after change" value, and a 'Next" button (B7) for transitioning to the next support screen.

When such a support screen (5b) is displayed, when the user of the terminal device 10 inputs an "after change" value="30" and presses the "Next" button (B7," the write processing part (154c) of the terminal device 10 transmits to the industrial machine 20 a write request indicating that the value of the parameter "b1-01" is to be changed to "30." Further, the display controller 155 of the terminal device 10 displays in the display 12 a support screen (5c) that allows the parameter that has the parameter number="c1-01" and is ranked second in priority to be edited.

In this way, according to the support information generation part (324b), the edit screens of the parameters related to the parameter associated with the change information can be sequentially displayed in the display 12 of the terminal device 10 in a wizard format according to the orders of priority of the related parameters.

Here, an example is described in which the "after change" value of a related parameter is input by a user. However, it is also possible that the support information generation part (324b) also presents an "after change" value of a related parameter as support information. In this case, as an "after change" value of a related parameter, the support info illation generation part (324b) can determine, for example, the most frequently appearing value, among the values of the "after change" item included in the change histories identified by the change history identification part (324a).

Further, it is also possible that the support information generation part (324b) stores the generated support information in the memory 33.

Support Information Transmission Part

The support information transmission part (324c) transmits the support information generated by the support information generation part (324b) to the terminal device 10 that is the transmission source of the change information. As a result, the support screens (5a) (5c) illustrated in FIGS. 12 and 13 are displayed in the display 12 of terminal device 10.

Abnormality Countermeasure Information Generation Part

When abnormality information is obtained from a terminal device 10, based on multiple pieces of abnormality information stored in the memory 33 and one or more change histories related to the obtained abnormality information, the abnormality countermeasure information generation part (324d) generates abnormality countermeasure information that indicates change content of a parameter for resolving an abnormality.

Here, an example of an abnormality countermeasure information generation process performed by the abnormality countermeasure information generation part (324d) is described with reference to FIG. 14. FIG. 14 illustrates an example of the abnormality countermeasure information generation process.

For example, as illustrated in FIG. 14, a change history (333e) that includes date and time="2015/11/02 11:01," an industrial machine ID="zzz4," a parameter number="d1-01," an "after change"="50" and an abnormality ID="E1," a change history (333f) that includes date and time "2015/11/02 11:02," an industrial machine ID="zzz4," a parameter number="d1-01," an "after change"="55" and an abnormality ID="E1," and a change history (333g) that includes date and time="2015/11/02 11:03," an industrial machine ID="zzz4," a parameter number="d1-01," an "after change"="60" and an abnormality ID="—(none)" are stored in the memory 33.

This indicates that an abnormality that has the abnormality ID="E1" and occurred in an industrial machine 20 having the industrial machine ID="zzz4" has been resolved by changing the value of the parameter having the parameter number="d1-01" to "60."

When abnormality information having the abnormality ID="E1" is obtained from a terminal device 10, the abnormality countermeasure information generation part (324d) identifies a series of change histories (333e)-(333g) from when the abnormality having the abnormality ID="E1" occurs to when the abnormality is resolved.

Then, based on the identified change histories (333e)-(333g), the abnormality countermeasure information generation part (324d) generates abnormality countermeasure information. For example, the abnormality countermeasure information generation part (324d) generates abnormality countermeasure information that includes a parameter number="d1-01" that is included in the change histories (333e)-(333g), and includes a value="60" of the parameter having the parameter number="d1-01" when the abnormality is resolved.

As a result, for example, abnormality countermeasure information is generated that proposes to change the value of the parameter having the parameter number="d1-01" to "60."

It is also possible that the abnormality countermeasure information generation part (324d) stores the generated abnormality countermeasure information in the memory 33.

Abnormality Countermeasure Information Transmission Part

The abnormality countermeasure information transmission part (324e) transmits the abnormality countermeasure information generated by the abnormality countermeasure information generation part (324d) to the terminal device 10 that is the transmission source of the abnormality information. Then, the display controller 155 of the terminal device 10 displays the received abnormality countermeasure information in the display 12.

Memory

The memory 33 is realized, for example, by a RAM, a semiconductor memory device such as a flash memory, or a storage device such as a hard disk or an optical disk. Such a memory 33 stores the user registration information 331, the backup data group 332, the change history group 333, the support information group 334, and the abnormality countermeasure information group 335. The user registration information 331 is information that includes a pair of a user ID and a password.

Processing Flow of Industrial Machine System

Next, an example of a processing flow of the devices in the above-described industrial machine system 1 is described with reference to FIG. 15. FIG. 15 illustrates an example of a processing flow of the devices in the industrial machine system 1. FIG. 15 illustrates an example of processing from when a user of a terminal device 10 performs a read operation of a parameter to when support information is displayed in the display 12 of the terminal device 10.

As illustrated in FIG. 15, in response to an input operation to the operation part 13, the controller 15 of the terminal device 10 performs a terminal side sorting process to sort out parameters to be requested from an industrial machine 20 (Process S101). Further, the controller 15 of the terminal device 10 transmits to the industrial machine 20 a read request of the parameters sorting out by the terminal side sorting process (Process S102).

The controller 24 of the industrial machine 20 performs an industrial machine side sorting process to sort out, according to a control mode that is currently set, parameters that can be changed by the terminal device 10 among the parameters sorted out by the terminal side sorting process (Process S103). Further, the controller 24 of the industrial machine 20 retrieves from the memory 25 the parameters sorted out by the industrial machine side sorting process and transmits the parameters to the terminal device 10 (Process S104).

The controller 15 of the terminal device 10 displays in the display 12 a list of the parameters obtained from the industrial machine 20 (Process S105). Further, in response to an input operation to the operation part 13, the controller 15 of the terminal device 10 transmits a write request of a parameter to the industrial machine 20 (Process S106).

The controller 24 of the industrial machine 20 performs a change process of a parameter stored in the memory 25 according to the write request from the terminal device 10 (Process S107), and transmits a change result to the terminal device 10 (Process S108).

When the change result is received from the industrial machine 20, the controller 15 of the terminal device 10 transmits change information of the parameter to the server 30 (Process S109), and the controller 32 of the server 30 stores the received change information in the memory 33 (Process S110). Further, based on multiple pieces of change information stored in the memory 33, the controller 32 of the server 30 generates support information that supports the parameter editing by the terminal device 10 (Process S111).

The controller 32 of the server 30 transmits the generated support information to the terminal device 10 (Process S112), and the controller 15 of the terminal device 10 displays the received support information in the display 12 (Process S113).

As described above, the industrial machine system 1 according to the present embodiment includes one or more industrial machines 20 and one or more terminal devices 10. The industrial machines 20 each control an operation of a control target machine 28 based on a set control mode among multiple control modes and multiple parameters. The terminal devices each wirelessly communicate with the industrial machines and are each capable of changing at least some of multiple parameters of each of the industrial machines. Further, the industrial machines 20 each include the industrial machine side sorting part (243*a*). The industrial machine side sorting part (243*a*) sorts out parameters that can be changed by a terminal device 10 among the multiple parameters according to a control mode that is set in the industrial machine 20. Further, the terminal devices 10 each include the display controller 155. The display controller 155 displays in the display 12 the changeable parameters that are sorted out by the industrial machine side sorting part (243*a*).

As a result, for example, the number of the parameters that are provided to a user of a terminal device 10 can be reduced, a parameter that the user wants to change can be easily formed, and a change omission is unlikely to occur, and thus, efficiency of the parameter editing can be improved. Further, by providing a sorting part on the industrial machine 20 side, filtered parameters are transmitted to a terminal device 10. Therefore, as compared to a case where a sorting part is provided only on the terminal device 10 side, communication traffic can be reduced. Further, parameters that are not to be known by general users can be prevented from being stored in a terminal device 10.

Further, the terminal devices 10 each include the terminal side sorting part (154*b*). In response to an input operation to the operation part 13, the terminal side sorting part (154*b*) sorts out parameters to be requested from the industrial machine 20 among the above-described at least some parameters. Further, according to a control mode that is set in the industrial machine 20, the industrial machine side sorting part (243*a*) sorts out parameters that can be changed by a terminal device 10 among the parameters sorted out by the terminal side sorting part (154*b*).

In this way, by performing, for example, using "favorite" or "keyword search" on the terminal device 10 side and further performing filtering, for example, using "control mode" or "access level" on the industrial machine 20 side, the number of parameters provided to the terminal device 10 can be further reduced and thus, communication traffic can be significantly reduced. Therefore, filtering can be performed on both the industrial machine 20 side and the terminal device 10 side. Usually, when parameter editing is performed in an industrial machine 20, a parameter to be changed by a user is biased for each user. Therefore, by sorting out on the terminal device 10 side only a parameter that reflects an operation by a user and is desired by the user and requesting the parameter from the industrial machine 20 side, the user's intention can be sufficiently reflected and accessibility to a desired parameter can be improved. In addition, after performing filtering on the terminal device 10 side, by performing filtering on the industrial machine 20 side, it is not necessary to return to the terminal device 10 a parameter for which an operation is not necessary depending on a control mode or it is desirable that an operation be preferably not performed and thus, it can be prevented that the user performs an erroneous operation. Further, parameters that are not to be known by general users can be prevented from being stored in the terminal device 10.

Further, the industrial machine side sorting part (243*a*) sorts out parameters that can be changed by the terminal device 10 according to a control mode that is set in the industrial machine 20 and a set access level that is set in the industrial machine 20 among multiple access levels.

As a result, for example, a parameter that cannot be changed in the current access level can be excluded from parameters provided to a user so that the number of the parameters provided to the user can be further reduced and thus, efficiency of the parameter editing can be further improved.

Further, the industrial machines 20 each include the access level changing part (243*c*). The access level changing part (243*c*) changes an access level that is set in the industrial machine 20 according to a terminal ID obtained from a terminal device 10 (an example of identification information of the terminal device).

In this way, by changing the access level according to the identification information of a terminal device 10, when a user wants to change a parameter that cannot be changed in the current access level, for example, an effort required to change the access level, such as inputting a password, can be omitted.

Further, the terminal devices 10 each include the input receiving part 151. The input receiving part 151 receives an input of a user ID (an example of identification information of a user). Further, the industrial machines 20 each include the access level changing part (243c). The access level changing part (243c) changes an access level that is set in the industrial machine 20 according to a user ID obtained from a terminal device 10.

In this way, by changing the access level according to the user ID, for example, even when one terminal device 10 is shared by multiple users, appropriate parameters in accordance with privileges granted to each user can be provided.

Further, the terminal devices 10 each include the backup processing part (154d). The backup processing part (154d) obtains, from an industrial machine 20, backup data that includes difference values relative to initial values of multiple parameters, and stores the obtained backup data in the memory 16 (an example of a backup data memory).

As a result, as compared to the case where the values of the parameters are obtained, the data amount of the backup data is reduced. Therefore, communication traffic of the backup process and the capacity of the memory 16 can be reduced.

Further, the industrial machines 20 are power conversion devices. Further, the terminal devices 10 each include the restore processing part (154e). When an industrial machine 20 is restored using the backup data stored in the memory 16, the restore processing part (154e) transmits to the industrial machine 20 a restore request that includes, among the difference values included in the backup data, difference values of parameters other than parameters that depend on the capacity of the industrial machine 20. Further, according to an input operation to the operation part 13, the restore processing part (154e) selects one of the first restore mode and the second restore mode, the first restore mode being a mode in which a restore request that includes, among the difference values included in the backup data, difference values of parameters other than parameters that depend on the capacity of an industrial machine 20 are transmitted to the industrial machine, and the second restore mode being a mode in which a restore request that includes all the difference values included in the backup data is transmitted to the industrial machine 20.

In this way, by excluding parameters that depend on the capacity of the industrial machine 20, which is a power conversion device, from write targets, when backup data of one power conversion device is written to another power conversion device having a capacity different from the one power conversion device, a problem is less likely to occur. Further, by having the first restore mode and the second restore mode, when the backup data of one power conversion device is written to another power conversion device having the same capacity as the one power conversion device, all the parameters including the parameters that depend on the capacity can be written.

Further, the terminal devices 10 each include the connection processing part 153. The connection processing part 153 transmits, to an industrial machine 20, a connection request for establishing a wireless communication connection with the industrial machine 20. Further, the industrial machines 20 each include the light emission processing part 242. When a connection request is received from a terminal device 10, the light emission processing part 242 causes the indicator 22 to emit light.

As a result, for example, when multiple industrial machines 20 are positioned close to each other, the industrial machine 20 to which the terminal device 10 is connected can be easily recognized by the user of the terminal device 10.

Further, the industrial machines 20 each include the operation controller 244 (an example of an operation stopping part). When the wireless communication connection with the terminal device 10 is disconnected, the operation controller 244 stops the operation. As a result, for example, a situation in which the operation is continued in an uncontrolled state can be avoided.

Further, the terminal devices 10 each include the parameter extraction part (154f) and the write processing part (154e). The parameter extraction part (154f) extracts, from a captured image of a control target machine 28, a parameter related to the control target machine 28 among at least some parameters. Further, the write processing part (154e) transmits a write request of the parameter extracted by the parameter extraction part (154f) to an industrial machine 20.

In this way, by extracting a parameter related to a control target machine 28 from a captured image of the control target machine 28, an input operation of a parameter related to the control target machine 28 can be simplified.

Further, the industrial machine system 1 includes the server 30 to which the terminal devices 10 can be connected. The server 30 includes the change information collection part (323a) and the support information generation part (324b). The change information collection part (323a) obtains change information of a parameter that is changed by one or more terminal devices 10 and stores the change information as a change history in the memory 33. Based on multiple change histories stored in the memory 33, the support information generation part (324b) generates support information that supports the parameter editing. Further, the display controller 155 of a terminal device 10 displays the support information in the display 12.

As a result, efficiency of an editing operation of a parameter can be further improved. For example, from change histories collected from one or more terminal devices 10, information about a parameter that is to be set next is provided as support information to a terminal device 10 from the server 30, and thereby, setting omission of a parameter can be prevented from occurring. Further, for an industrial machine 20, while there are cases where it is required that a large number of parameters are properly set according to an intended use and a control target machine 28, there are also cases where it is difficult that all parameter settings taking into account of an intended use and a control target machine 28 are prepared in advance on a system provider side. Therefore, from change histories collected from one or more terminal devices 10, parameter settings that are set in an industrial machine 20 that is used for the same intended use and control target machine 28 are provided as support information to a terminal device 10 from the server 30. Thereby, even when parameter settings corresponding to the intended use and the control target machine 28 are not prepared in advance, the parameter editing for an industrial machine 20 that is used for the intended use and the control target machine 28 can be efficiently performed.

Further, the server 30 includes the change history identification part (324a). When change information is obtained from a terminal device 10, based on the multiple change histories stored in the memory 33, the change history identification part (324a) identifies one or more parameter change histories related to a parameter associated with the obtained change information. Further, the support information generation part (324b) generates support information based on a change history identified by the change history identification part (324a).

In this way, by providing information about a parameter related to a parameter that has been changed by a terminal device 10, for example, a parameter that is highly likely to be changed following the changed parameter, to the terminal device 10, setting omission of a parameter can be prevented from occurring. Further, even for a user who is not familiar with the parameter editing, the parameter editing can be easily performed.

Further, the change information collection part (323*a*) obtains from a terminal device 10 application information about application of the industrial machine 20 to which the terminal device 10 is connected, and stores the application information in association with one or more change histories in the memory 33. Further, when application information is obtained from a terminal device 10, based on multiple pieces of application information stored in the memory 33 and one or more change histories associated with the application information, the change history identification part (324*a*) generate one or more parameter change histories related to the obtained application information.

In this way, by providing support information corresponding to an intended use that is set in an industrial machine 20, a user of a terminal device 10 can be prompted to make a change to a parameter suitable for the intended use. Therefore, simple guidance for parameter setting can be easily performed. A change history of a parameter can include information such as whether or not the parameter has been changed, a setting value of the parameter after the parameter has been changed, a change frequency, and the like. Further, whether or not a parameter has been changed may also be used as a change history. In this case, it is also possible that the display controller 155 displays a list of parameters having change histories.

Further, based on the multiple change histories stored in the memory 33, the support information generation part (324*b*) determines an order of priority for each of two or more parameters identified by the change history identification part (324*a*), and generates support information that includes the determined orders of priority and the two or more parameters identified by the change history identification part (324*a*). The display controller 155 displays the two or more parameters included in the support information based on the orders of priority included in the support information.

As a result, for example, a parameter that is more frequently changed together with the parameter associated with the obtained change information can be more preferentially displayed than a parameter that is less frequently changed together with the parameter associated with the obtained change information. Therefore, a change history that is more informative to a user of a terminal device 10 can be preferentially provided.

Further, the server 30 includes the abnormality information collection part (323*b*) and the abnormality countermeasure information generation part (324*d*). The abnormality information collection part (323*b*) obtains, from a terminal device 10, abnormality information that indicates the content of an abnormality occurring in an industrial machine 20, and stores in the memory 33 the abnormality information in association with one or more change histories. When abnormality information is obtained from a terminal device 10, based on multiple pieces of abnormality information stored in the memory 33 and one or more change histories related to the obtained abnormality information, the abnormality countermeasure information generation part (324*d*) generates abnormality countermeasure information that indicates change content of a parameter for resolving an abnormality. Further, the display controller 155 of a terminal device 10 displays the abnormality countermeasure information in the display 12.

As a result, for example, for a user troubleshooting an industrial machine 20, guidance such as which parameter is to be changed in order to resolve the problem can be provided, and efficiency of the parameter editing during troubleshooting can be improved.

Further, the industrial machine 20 according to the present embodiment is an industrial machine used in the industrial machine system 1 according to the present embodiment and includes the operation controller 244, the industrial machine side sorting part (243*a*), and the parameter transmission part (243*b*). The operation controller 244 controls an operation of a control target machine 28 based on a set control mode among multiple control modes and multiple parameters. The industrial machine side sorting part (243*a*) sorts out parameters that can be changed by a terminal device 10 among the multiple parameters according to a control mode that is set in the industrial machine 20. The parameter transmission part (243*b*) transmits parameters that are sorted out by the industrial machine side sorting part (243*a*) to a terminal device 10 by wireless communication. As a result, an industrial machine that allows efficiency of an editing operation of a parameter to be improved can be provided.

Further, the terminal device 10 according to the present embodiment is a terminal device that is used in the industrial machine system 1 according to the present embodiment, and includes the terminal side sorting part (154*b*) and the display controller 155. In response to an input operation to the operation part 13, the terminal side sorting part (154*b*) sorts out a parameter to be requested from the industrial machine 20 among at least some parameters. The display controller 155 displays in the display 12 the changeable parameters that are sorted out by the industrial machine side sorting part (243*a*). As a result, a terminal device that allows efficiency of an editing operation of a parameter to be improved can be provided.

Further, the server 30 according to the present embodiment is a server that is used in the industrial machine system 1 according to the present embodiment, and includes the change information collection part (323*a*), the support information generation part (324*b*), and the support information transmission part (324*c*). The change information collection part (323*a*) obtains change information of a parameter that is changed by one or more terminal devices 10, among multiple parameters that are set in one or more industrial machines 20, and stores the change information as a change history in the memory 33. Based on multiple change histories stored in the memory 33, the support information generation part (324*b*) generates support information that supports the parameter editing. The support information transmission part (324*c*) transmits the support information generated by the support information generation part (324*b*) to a terminal device 10. As a result, a server that allows efficiency of an editing operation of a parameter to be improved can be provided.

In the above-described industrial machine system 1, the industrial machine 20 includes "a means that sorts out a parameter that can be changed by a terminal device among multiple parameters of the industrial machine such that the parameter editing by the terminal device is optimized for each control mode that is set in the industrial machine"; and the terminal device 10 includes "a means that displays in a display the parameter that is sorted out by the above-described sorting means and can be changed by the terminal device." The industrial machine side sorting part (243*a*) is an example of the "means that sorts out a parameter that can be changed by a terminal device among multiple parameters of the industrial machine such that the parameter editing by the terminal device is optimized for each control mode that is set in the industrial machine." The display controller 155 is an example of the "means that displays in a display the parameter that is sorted out by the above-described sorting means and can be changed by the terminal device."

In the above-described embodiment, the industrial machine system 1 that includes two or more industrial machines 20 and two or more terminal devices 10 is described. However, it is also possible that the industrial machine system 1 includes at least one industrial machine 20 and at least one terminal device 10.

Further, in the above-described embodiment, the industrial machine system 1 that includes one server 30 is described. However, it is also possible that the industrial machine system 1 includes two or more servers that each have some of the functions of the server 30. For example, it is also possible that the industrial machine system 1 includes a first server that performs generation of the support information, and a second server that performs generation of the abnormality countermeasure information.

Further, in the above-described embodiment, an example of a case is described where a terminal device 10 and an industrial machine 20 are connected capable of wireless communication. However, the connection between the terminal device 10 and the industrial machine 20 is not limited to a wireless connection, but may also be a wired connection. That is, depending on a function achieved by the structure of the above-described industrial machine system 1, it is also possible that the terminal device 10 and the industrial machine 20 perform wired communication. Similarly, depending on a function achieved by the structure of the above-described industrial machine system 1, it is also possible that the terminal device 10 and the server 30 perform wired communication. However, depending on a function, it is possible that wireless communication achieves a greater effect than wired communication.

In a conventional technology, there is room for further improvement in efficiency of editing operation of a parameter.

An industrial machine system, an industrial machine, a terminal device, a server and a parameter editing method of an industrial machine according to embodiments of the present invention allow efficiency of an editing operation of a parameter.

An industrial machine system according to one aspect of an embodiment includes one or more industrial machines and one or more terminal devices. The industrial machines each control an operation of a control target machine based on a set control mode among multiple control modes and multiple parameters. The terminal devices each wirelessly communicate with the industrial machines and are each capable of changing at least some of multiple parameters of each of the industrial machines. Further, the industrial machines each include an industrial machine side sorting part. The industrial machine side sorting part sorts out a parameter that can be changed by a terminal device among the multiple parameters according to a set control mode. Further, the terminal devices each include a display controller. The display controller displays in a display the changeable parameter that is sorted out by the industrial machine side sorting part.

According one aspect of an embodiment, an industrial machine system, an industrial machine, a terminal device, a server and a parameter editing method of the industrial machine can be provided that allow efficiency of an editing operation of a parameter to be improved.

Obviously, numerous modifications and variations of the present invention are possible in light of the above teachings. It is therefore to be understood that within the scope of the appended claims, the invention may be practiced otherwise than as specifically described herein.

What is claimed is:

1. An industrial machine system, comprising:
an industrial machine comprising circuitry configured to control operation of a control target machine based on a plurality of parameters and a set control mode among a plurality of control modes; and
a terminal device comprising circuitry configured to change at least part of the parameters in the industrial machine through wireless communication,
wherein the circuitry of the industrial machine is configured to designate, based on the set control mode, changeable parameters changeable by the terminal device among the plurality of parameters while filtering out non-changeable parameters that are not changeable by the terminal device among the plurality of parameters in the set control mode, and the circuitry of the terminal device is configured to control display of the changeable parameters designated by the circuitry of the industrial machine, on a display.

2. The industrial machine system according to claim 1, wherein the circuitry of the terminal device is configured to designate in response to input operation, parameters to be requested of the industrial machine among the at least part of the parameters, and the circuitry of the industrial machine is configured to designate, in response to the set control mode, the changeable parameters among the parameters designated by the terminal device.

3. The industrial machine system according to claim 1, wherein the circuitry of the industrial machine is configured to designate, in response to an access level set by the circuitry of the industrial machine among a plurality of access levels, the changeable parameters.

4. The industrial machine system according to claim 3, wherein the circuitry of the industrial machine is configured to change, in response to identification information of the terminal device obtained from the terminal device, the access level set by the circuitry of the industrial machine.

5. The industrial machine system according to claim 3, wherein the circuitry of the terminal device is configured to accept an input of identification information of a user, and the circuitry of the industrial machine is configured to change, in response to the identification information of the user obtained from the terminal device, the access level set by the circuitry of the industrial machine.

6. The industrial machine system according to claim 1, wherein the circuitry of the terminal device is configured to obtain, from the industrial machine, backup data including difference values relative to initial values of the plurality of parameters, and store the backup data obtained from the industrial machine.

7. The industrial machine system according to claim 6, wherein the industrial machine comprises a power conversion device, the circuitry of the terminal device is configured to transmit a restore request including difference values of parameters except parameters depending on capacity of the industrial machine among the difference values in the backup data, when restoring the industrial machine using the backup data, and select, in response to input operation, a first restore mode in which the restore request is transmitted to the industrial machine or a second restore mode in which a restore request including all of the difference values in the backup data is transmitted to the industrial machine.

8. The industrial machine system according to claim 1, wherein the circuitry of the terminal device is configured to transmit a connection request which establishes wireless communication connection with the terminal device, and the circuitry of the industrial machine is configured to control an indicator to emit light when the connection request is received from the terminal device.

9. The industrial machine system according to claim 1, wherein the circuitry of the industrial machine is configured to stop operation of the industrial machine when the wireless communication connection is disconnected from the terminal device.

10. The industrial machine system according to claim 1, wherein the circuitry of the terminal device is configured to extract, from a captured image of the control target machine, a parameter related to the control target machine from the at least part of plurality of parameters, and transmit a write request of the parameter extracted from the captured image of the control target machine.

11. The industrial machine system according to claim 1, further comprising:
a server configured to be connected to the terminal device and comprising circuitry configured to obtain change information of parameters changed by the terminal device, store change history of the parameters changed by the terminal device, and generate support information which supports parameter editing based on a plurality of stored change histories,
wherein the circuitry of the terminal device is configured to control display of the support information on the display.

12. The industrial machine system according to claim 11, wherein the circuitry of the server is configured to identify, based on the plurality of stored change histories, at least one parameter change history related to the parameter associated with the change information obtained, when the change information is obtained from the terminal device, and the circuitry of the server is configured to generate the support information based on the at least one parameter change history identified based on the plurality of stored change histories.

13. The industrial machine system according to claim 12, wherein the circuitry of the server is configured to obtain application information related to application of the industrial machine connecting with the terminal device, associate the application information with at least one of the change history, store the application information associated with at least one of the change history, and identify at least one parameter change history associated with the application information obtained based on a plurality of stored application information and at least one of stored change histories associated with the stored application information, when the application information is obtained from the terminal device.

14. The industrial machine system according to claim 12, wherein the circuitry of the server is configured to determine a plurality of orders of priority for every two or more parameters identified based on the stored change histories, and generate support the information including the orders of priority and the two or more parameters, and the circuitry of the terminal device is configured to control display of the two or more parameters in the support information based on the orders of priority in the support information on the display.

15. The industrial machine system according to claim 12, wherein the circuitry of the server is configured to obtain, from the terminal device, abnormality information indicating content of abnormality occurred in the industrial machine, associate the abnormality information with at least one of the change history, store the abnormality information associated with at least one of the change history, and generate, based on a plurality of stored abnormality information and at least one of stored change histories associated with the stored abnormality information, when the abnormality information is obtained from the terminal device, and the circuitry of the terminal device is configured to control display of the abnormality information on the display.

16. The industrial machine system according to claim 2, wherein the circuitry of the industrial machine is configured to designate, in response to an access level set by the circuitry of the industrial machine among a plurality of access levels, the changeable parameters.

17. The industrial machine system according to claim 16, wherein the circuitry of the industrial machine is configured to change, in response to identification information of the terminal device obtained from the terminal device, the access level set by the circuitry of the industrial machine.

18. The industrial machine system according to claim 4, wherein the circuitry of the terminal device is configured to accept an input of identification information of a user, and the circuitry of the industrial machine is configured to change, in response to the identification information of the user obtained from the terminal device, the access level set by the circuitry of the industrial machine.

19. An industrial machine, comprising:
circuitry configured to control operation of a control target machine based on a plurality of parameters and a set control mode among a plurality of control modes,
wherein the circuitry of the industrial machine is configured to communicate, through wireless communication, with a terminal device comprising circuitry configured to change at least part of the parameters in the industrial machine, and designate, based on the set control mode, changeable parameters changeable by the terminal device among the plurality of parameters while filtering out non-changeable parameters that are not changeable by the terminal device among the plurality of parameters in the set control mode, and the circuitry of the terminal device is configured to control display of the changeable parameters designated by the circuitry of the industrial machine, on a display.

20. A method for editing a parameter of an industrial machine, comprising:
designating, based on a set control mode, changeable parameters changeable by a terminal device among a plurality of parameters by circuitry of an industrial machine while filtering out non-changeable parameters that are not changeable by the terminal device among the plurality of parameters in the set control mode; and
controlling display of the changeable parameters designated by the circuitry of the industrial machine on a display by circuitry of the terminal device,
wherein the industrial machine comprises the circuitry configured to control operation of a control target machine based on the plurality of parameters and the set control mode among a plurality of control modes, and the terminal device comprises the circuitry configured to change at least part of the parameters in the industrial machine through wireless communication.

* * * * *